United States Patent
Izumi et al.

(10) Patent No.: US 6,491,227 B2
(45) Date of Patent: *Dec. 10, 2002

(54) ERRONEOUS INSERTION PREVENTION MECHANISM

(75) Inventors: Koji Izumi; Hiroyuki Mami, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,057

(22) Filed: May 5, 2000

(65) Prior Publication Data

US 2002/0125327 A1 Sep. 12, 2002

(30) Foreign Application Priority Data

May 7, 1999 (JP) .............................. 11-127350

(51) Int. Cl.[7] .............................................. G06K 19/00
(52) U.S. Cl. ...................... 235/487; 235/483; 235/475; 235/486; 235/482; 235/484
(58) Field of Search ................................ 235/487, 483, 235/475, 482, 484, 486

(56) References Cited

U.S. PATENT DOCUMENTS

| | | | |
|---|---|---|---|
| 4,021,827 A | * 5/1977 | Ichii | 396/30 |
| 4,780,603 A | 10/1988 | Hamada | |
| 4,931,622 A | * 6/1990 | Ohtsuki et al. | 235/441 |
| 5,164,935 A | * 11/1992 | Shimegi et al. | 369/77.2 |
| 5,485,330 A | * 1/1996 | Hirose et al. | 360/99.06 |
| 5,598,319 A | * 1/1997 | Lee | 361/684 |
| 5,675,566 A | * 10/1997 | Kosaka et al. | 369/77.1 |
| 5,959,804 A | * 9/1999 | Hashimoto et al. | 360/99.06 |
| 6,108,505 A | * 8/2000 | Hayashi | 399/206 |
| 6,118,619 A | * 9/2000 | Kabasawa | 360/99.06 |
| 6,271,989 B1 | * 8/2001 | Tannert | 360/99.06 |

FOREIGN PATENT DOCUMENTS

| | | |
|---|---|---|
| JP | 02 127093 | 5/1990 |
| JP | 405351736 A | * 12/1993 |

* cited by examiner

Primary Examiner—Michael G. Lee
Assistant Examiner—Daniel Walsh
(74) Attorney, Agent, or Firm—Frommer Lawrence & Haug LLP; William S. Frommer; Matthew K. Ryan

(57) ABSTRACT

In order to make it possible to determine the erroneous insertion of an information recording medium at a position close to a recording medium insertion port by utilizing a notch portion provided at the information recording medium, the present invention relates to an electronic apparatus comprising a recording medium insertion port for taking in and out a memory stick having a notch portion used to prevent erroneous insertion and provided in one corner, and an erroneous insertion preventive mechanism provided inside the recording medium insertion port so as to prevent the erroneous insertion of the memory stick, and recording and/or reproducing an information signal using the memory stick. The erroneous insertion preventive mechanism is moved outside for the notch portion of the memory stick to allow the insertion of the memory stick, and is engaged for corners other than the notch portion to hamper the insertion of the memory stick.

7 Claims, 17 Drawing Sheets

F I G. 9
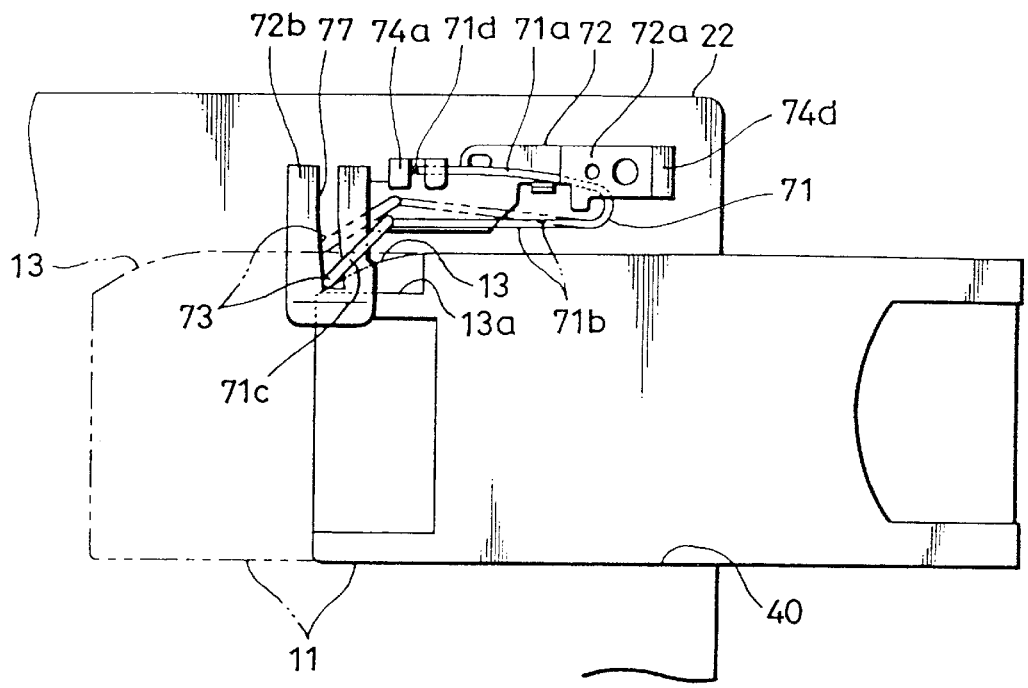
F I G. 10
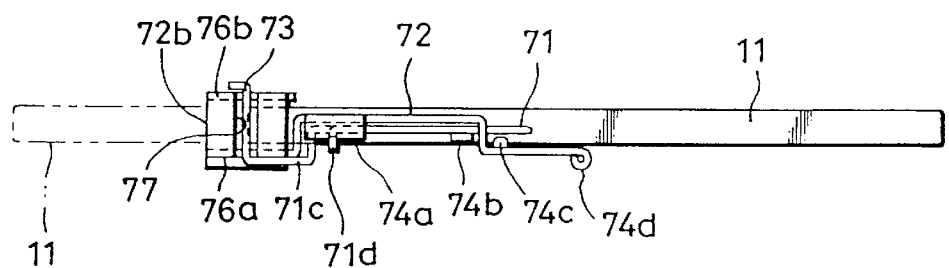
F I G. 11
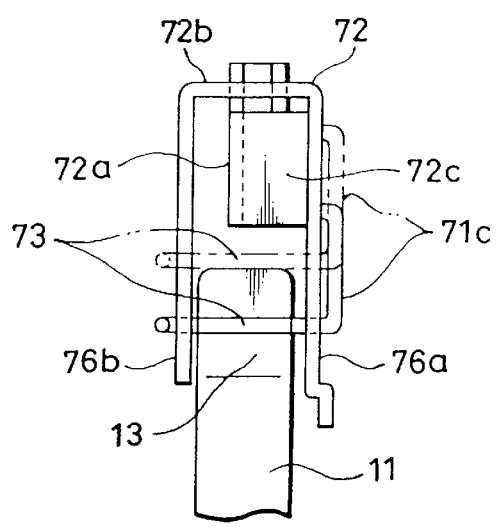

$M = Fa \times L = F \times Lo$

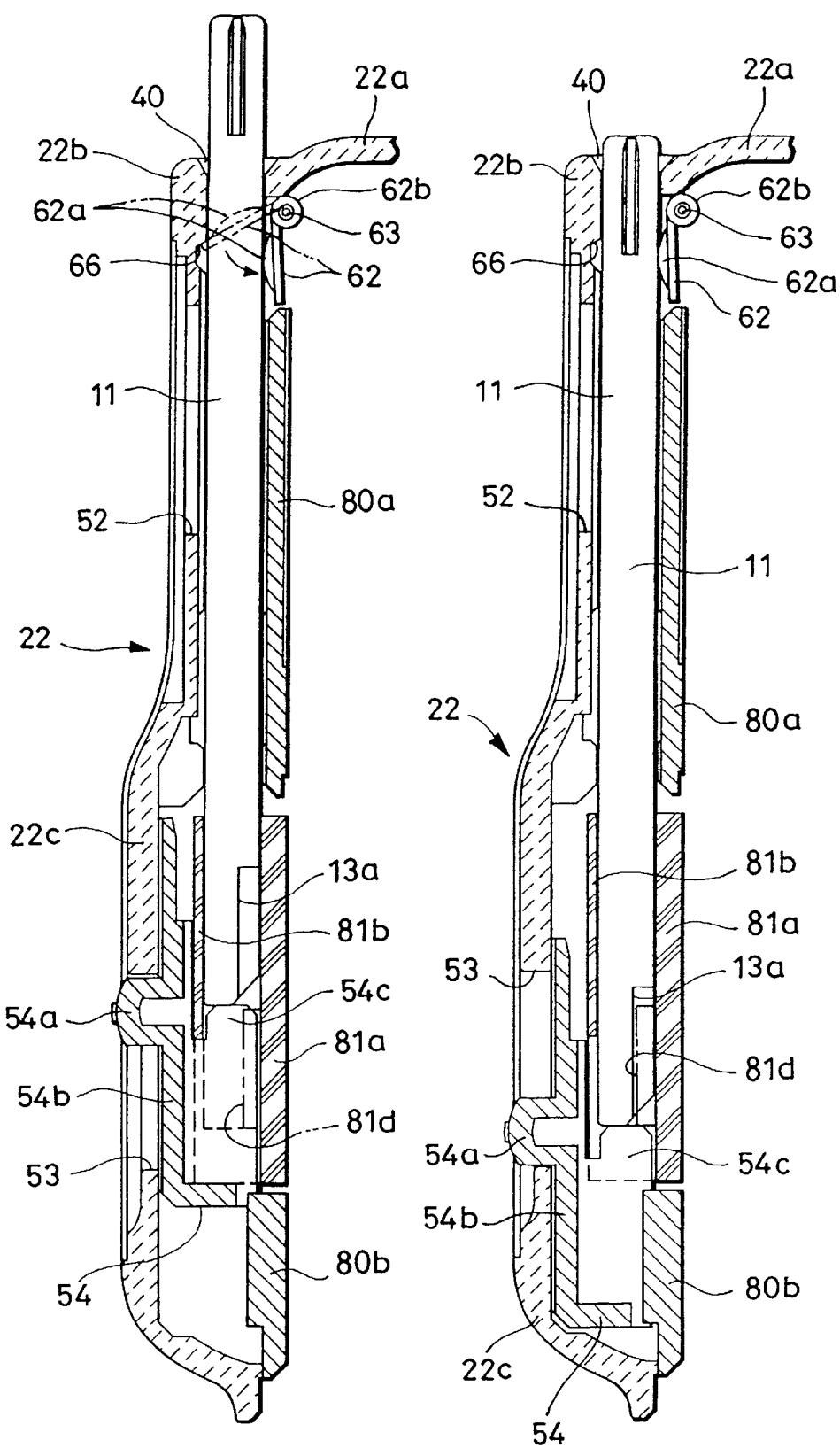

F I G. 18
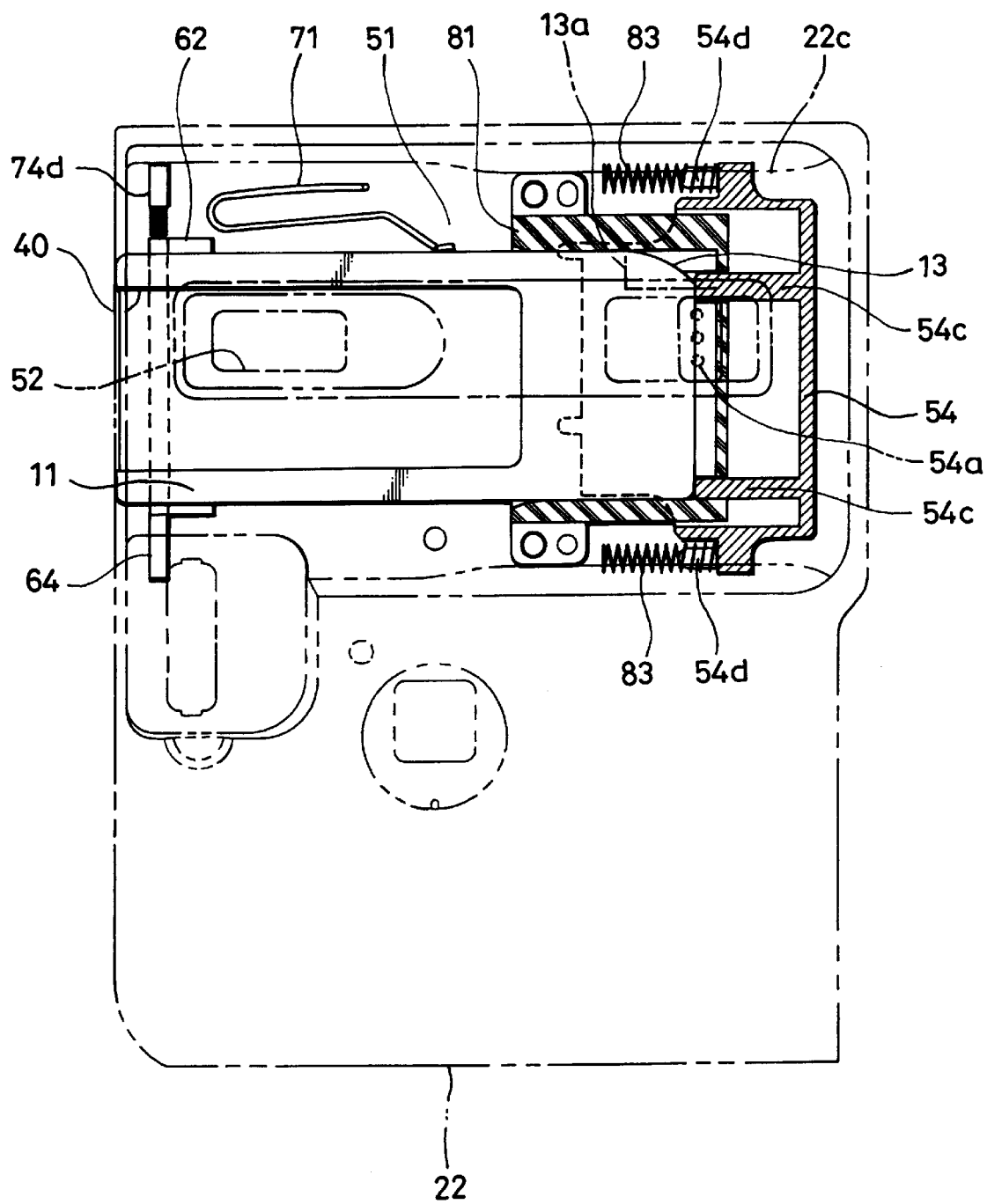

ERRONEOUS INSERTION PREVENTION MECHANISM

BACKGROUND OF THE INVENTION

1. Field of the Invention

The present invention relates to an electronic apparatus such as a digital video camera recorder (or a camera integral type video tape recorder), an electronic still camera and an electronic book player, using an information recording medium such as IC recording medium normally referred to as a memory stick, a FD (floppy disk) in which a magnetic disk is stored or a disk-shaped recording medium in which an optical disk is stored. The present invention particularly relates to an erroneous insertion preventive mechanism for preventing an information recording medium from being erroneously inserted into an apparatus main body.

2. Description of the Related Art

Generally, there have been hitherto known, as electronic apparatus for recording and/or reproducing an information signal using an information recording medium such as a cassette tape or an FD (floppy disk) having a magnetic tape, a magnetic disk or the like stored in a cassette housing, a camera integral type video tape recorder (to be referred to as "camera integral type VTR" hereinafter), and the like. This camera integral type VTR is constituted by providing a color camera and a video tape recorder integrally with each other and roughly consists of a camera block and a VTR block.

The camera block of the camera integral type VTR is comprised of a lens section fetching an image as a light, a photoelectric conversion section for converting an optical image passed through this lens section into an electric signal and a camera circuit section for processing the electric signal. Also, the VTR block is comprised of a mechanical deck section for holding a cassette tape serving as an information recording medium and recording and reading an information signal on/from a magnetic tape, a VTR circuit section for processing the information signal and a frame section for supporting the VTR circuit section and the mechanical deck section. The magnetic tape stored in the cassette tape is pulled out from within the cassette housing by a tape loading mechanism in the mechanical deck section, wound around a rotary drum and moved at a predetermined speed. A magnetic head attached to the rotary drum comes into contact with this magnetic tape while rotation. The information signal is written to the magnetic tape by this magnetic head or read from the magnetic tape.

As for such a camera integral type VTR or other electronic apparatus, a compact and highly reliable IC recording medium normally referred to as "a memory stick" has been recently developed and used as an information recording medium. By employing the memory stick as an expansion memory in addition to the cassette tape which is a conventional information recording medium, it has been possible to increase the recording capacity of recordable information. As a result, the recording capacity of a memory is increased by using the memory stick in, for example, a camera integral type VTR, many still images can be recorded with one memory stick and the convenience of the electronic apparatus of this type can thereby improve.

This memory stick has an outline as shown in FIGS. 21A and 21B. Namely, the memory stick 1 has a generally rectangular, thin, flat case main body 2 and a memory of mass storage capacity included in this case main body 2. A notch portion 3 is provided in one of corners at a tip end side in the insertion direction in which the case main body 2 is inserted into the electronic apparatus, so as to prevent the case main body 2 from being erroneously inserted thereinto. This notch portion 3 is formed into a convex circular arc surface and a concave portion 3a opened forward and laterally is provided on one surface of the case main body 2 of this notch portion 3. Also, many connector pins 4 are provided at the tip end side of the case main body 2. These connector pins 4 are exposed to the same surface as that of the concave portion 3a of the case main body 2. When the memory stick 1 is inserted, the connector pins 4 are connected to apparatus main body-side terminals inserted from a forward opening.

The memory stick 1 having such a configuration is detachably installed into an electronic apparatus from a recording medium insertion port 6 provided at the apparatus main body 5. This recording medium insertion port 6 is a space section having a size corresponding to the memory stick 1. A convex portion 6a engageable with the concave portion 3a of the memory stick 1 is provided in one of deepest corners of the insertion port 6. This convex portion 6a is provided on one surface of the recording medium insertion port 6 and configured such that the convex portion 6a is engaged with the concave portion 3a only when the memory stick 1 is inserted into the recording medium insertion port 6 with a correct posture in correct insertion direction.

However, the electronic apparatus according to the above-stated prior art is configured to employ, as means for determining whether the memory stick 1 is inserted in a normal state or a wrong state, the concave portion 3a of the memory stick 1 and the convex portion 6a of the apparatus main body 5. Whether the memory stick 1 is inserted normally or erroneously can be determined according to whether or not the concave portion 3a of the notch portion 3 is engaged with the convex portion 6a of the recording medium insertion port 6. In addition, since the convex portion 6a is provided in the deepest portion of the recording medium insertion port 6, the concave portion 3a does not reach the position of the convex portion 6a until the memory stick 1 is inserted up to the vicinity of the terminal end. Due to this, the electronic apparatus has problems that it is unclear whether the concave portion 3a is fitted into the convex portion 6a unless the memory stick 1 is inserted into the very end and that determination as to erroneous insertion cannot be made until the final stage.

That is to say, the depth of the notch portion 3 of the memory stick 1 (distance from the tip end of the memory stick 1) is restricted by an internal structure such as a memory and the like stored in the case main body 2 and is actually as small as about 7 mm. As a result, the determination as to the erroneous insertion can be made only immediately before the insertion operation of the memory stick 1 (not beyond 7 mm) is completely finished. This causes a user to be slow to recognize that the insertion direction of the memory stick 1 is wrong during the insertion of the memory stick 1.

Furthermore, the difference between the distance by which the memory stick 1 can be inserted into the apparatus main body 5 during erroneous insertion and the position of the memory stick 1 when the stick 1 is inserted correctly and insertion operation is completed is small (7 mm). For this, it is difficult to determine whether the memory stick 1 is inserted correctly or erroneously only from the insertion state of the memory stick 1. Due to this, if a user makes an erroneous determination and inserts the memory stick 1 from the erroneous insertion position by force despite the fact that the stick 1 is erroneously inserted, then there is a fear that the memory stick 1 and/or the apparatus main body 5 are damaged.

SUMMARY OF THE INVENTION

The present invention has been made in view of the above-stated conventional problems. The object of the present invention is, therefore, to solve the above-stated problems by making it possible to determine the erroneous insertion of an information recording medium at a position close to an recording medium insertion port while utilizing a notch portion provided in the information recording medium.

To solve the above-stated problems and the like and to attain the above object, an electronic apparatus recited in claim 1 of the present invention is an electronic apparatus for recording and/or reproducing an information signal using an information recording medium, comprising: a recording medium insertion port for taking in and out the information recording medium having a notch portion used to prevent erroneous insertion in one corner of the information recording medium; and an erroneous insertion preventive mechanism provided inside the recording medium insertion port to prevent erroneous insertion of the information recording medium, is characterized in that the erroneous insertion preventive mechanism is configured to be moved outward for the notch portion of the information recording medium to thereby allow the insertion of the information recording medium, and configured to be engaged for corners other than the notch portion of the information recording medium to thereby prevent the insertion of the recording medium.

An electronic apparatus recited in claim 2 of the present invention is characterized in that the erroneous insertion preventive mechanism has an elastic spring member having a stopper portion protruding forward in an insertion direction of the information recording medium and a support member for allowing the stopper member to be elastically deformed and supporting the spring member.

An electronic apparatus recited in claim 3 of the present invention is characterized in that the support member has a fixed portion for supporting one end of the spring member and a support portion formed integrally with the fixed portion, the support member being provided with a guide groove for moving the stopper portion for the notch portion of the information recording medium and for receiving the stopper portion to generate a reaction force for the corners other than the notch portion of the information recording medium.

An electronic apparatus recited in claim 4 of the present invention is characterized in that the support portion has a pair of support pieces formed to stride the inserted information recording medium and provided to overlap with the guide groove, the pair of support pieces supporting both ends of the stopper portion.

According to the electronic apparatus recited in claim 1 of the present invention and configured as stated above, due to the erroneous insertion preventive mechanism provided inside the recording medium insertion port, when the information recording medium is inserted in a correct state (with a correct posture in correct direction), the hotch portion for preventing the erroneous insertion of the information recording medium allows the passage of the medium and the medium is inserted to reach a predetermined position. On the other hand, when the information recording medium is inserted in a wrong state (which is a state other than the correct state), the corners other than the notch portion hamper the passage of the information recording medium and the medium is not inserted to reach the predetermined position.

According to the electronic apparatus recited in claim 2 of the present invention, the stopper portion of the spring member protrudes forward in the insertion direction of the information recording medium and the support member supports this spring member, whereby the stopper portion is guided by the notch portion and moved outside only when the information recording medium is inserted in a correct state to thereby allow the insertion operation of the information recording medium, and the stopper portion is abutted against the corners other than the notch portion when the information recording medium is inserted in a wrong state to thereby hamper the insertion operation of the information recording medium.

According to the electronic apparatus recited in claim 3 of the present invention, the entire body of the spring member is supported by the fixed portion, a guide groove is provided at the support portion continuous to this fixed portion and the stopper portion of the spring member is inserted into the guide groove, whereby when the information recording medium is inserted ih a correct state, the notch portion moves the stopper portion outside along the guide groove to allow the insertion operation of the information recording medium. When the information recording medium is inserted in a wrong state, the stopper portion is engaged by the corners other than the notch portion inside the guide groove to hamper the insertion operation of the information recording medium.

According to the electronic apparatus recited in claim 4 of the present invention, the stopper portion of the spring member is inserted into the guide groove provided at the paired support pieces so that the pieces overlap each other, whereby when the information recording medium is inserted in a wrong state and the corners other than the notch portion are abutted against the stopper portion, the both ends of the stopper portion are supported by the paired support pieces. It is, therefore, possible to resist the excessive insertion force applied from a user and to prevent the damages of the information recording medium and/or the apparatus main body because of forcedly applying the insertion force.

BRIEF DESCRIPTION OF THE DRAWINGS

FIG. 9 shows the operation of the erroneous insertion preventive mechanism according to the electronic apparatus of the present invention and is a side view showing that the information recording medium is inserted in a correct state;

FIG. 10 shows the operation of the erroneous insertion preventive mechanism according to the electronic apparatus of the present invention and is a plan view showing that the information recording medium is inserted in a correct state;

FIG. 11 shows the operation of the erroneous insertion preventive mechanism according to the electronic apparatus of the present invention and is a front view of the enlarged important parts of the erroneous insertion preventive mechanism when the information recording medium is inserted in a correct state;

FIG. 17 shows a cross section of the recording medium storage section according to the electronic apparatus of the present invention; A is a cross-sectional view of the recording medium storage section in a state in which the information recording medium is inserted in the middle of the storage section and B is a cross-sectional view of the recording medium storage section in a state in which the information recording medium is completely inserted;

FIG. 18 shows the recording medium storage section according to the electronic apparatus of the present invention and is an explanatory view showing the state of the recording medium storage section before the information recording medium is extruded;

DESCRIPTION OF THE PREFERRED EMBODIMENTS

An embodiment of the present invention will be described hereinafter with reference to the drawings. FIGS. 1 to 20 show one example of an embodiment of the present invention, which example is applied to a digital video camera recorder (or a camera integral type video recorder which will be referred to as "camera integral type VTR" hereinafter) showing a concrete example of an electronic apparatus. Other concrete examples of the electronic apparatus involve, for example, an electronic still camera, an electronic book player, a digital photographic printer, a color video printer, a personal computer and the like.

Figure 1:
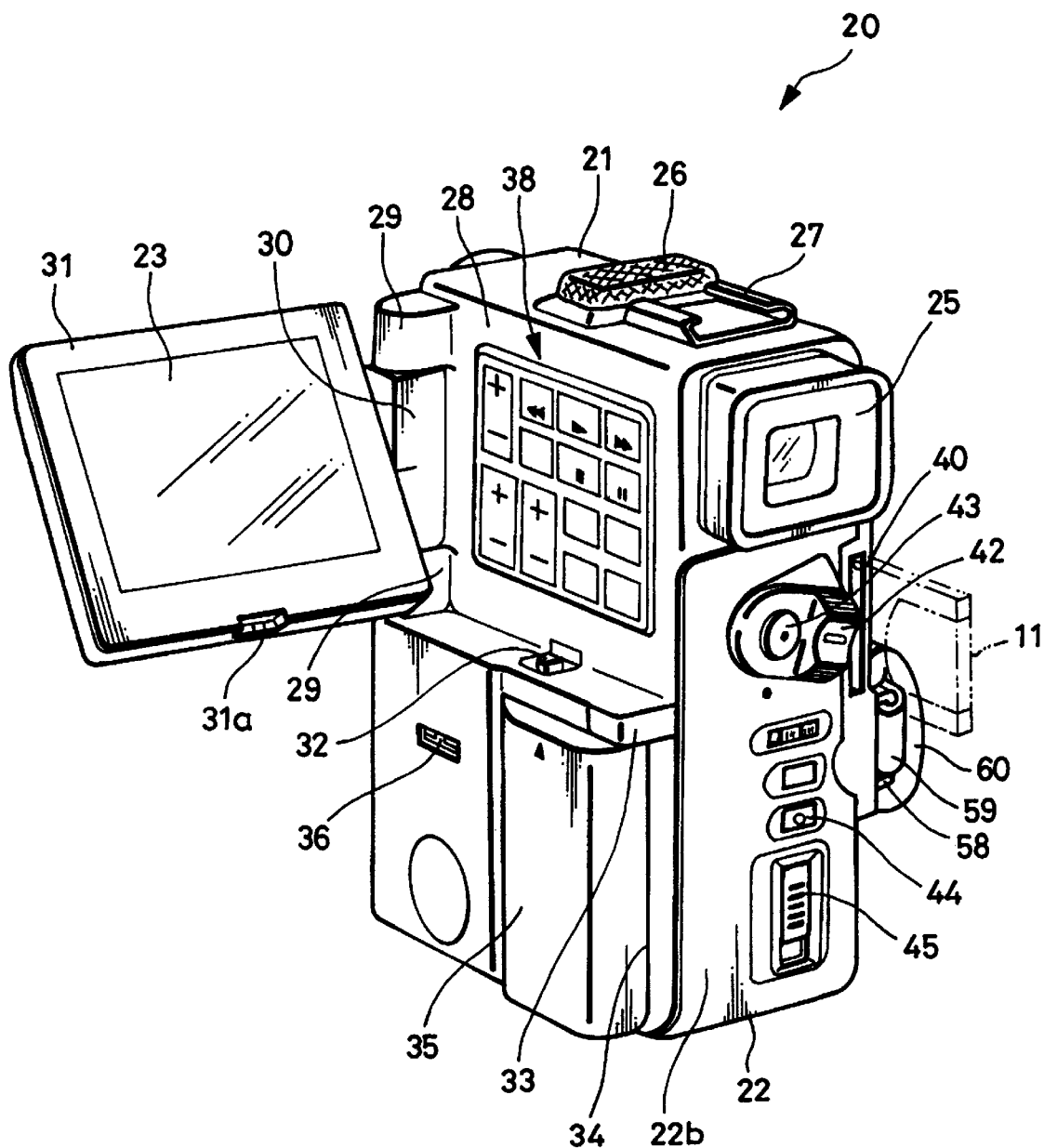
FIG. 1 shows one embodiment of an electronic apparatus according to the present invention and is a perspective view showing a state in which a camera integral type VTR applied as the electronic apparatus is seen from a back side.
Figure 2:
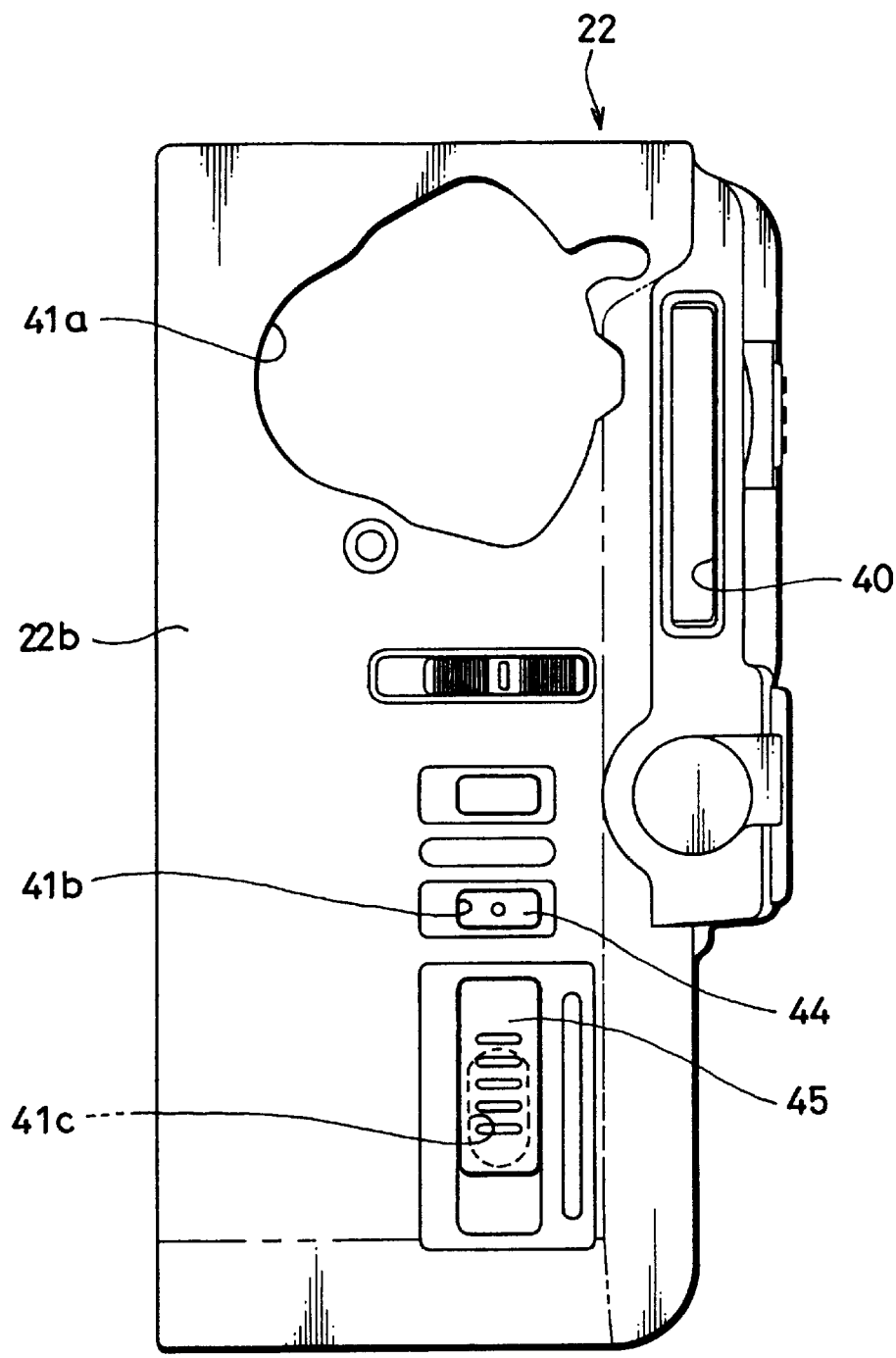
FIG. 2 is a front view of the back surface of an apparatus cover according to the electronic apparatus of the present invention.
Figure 3:
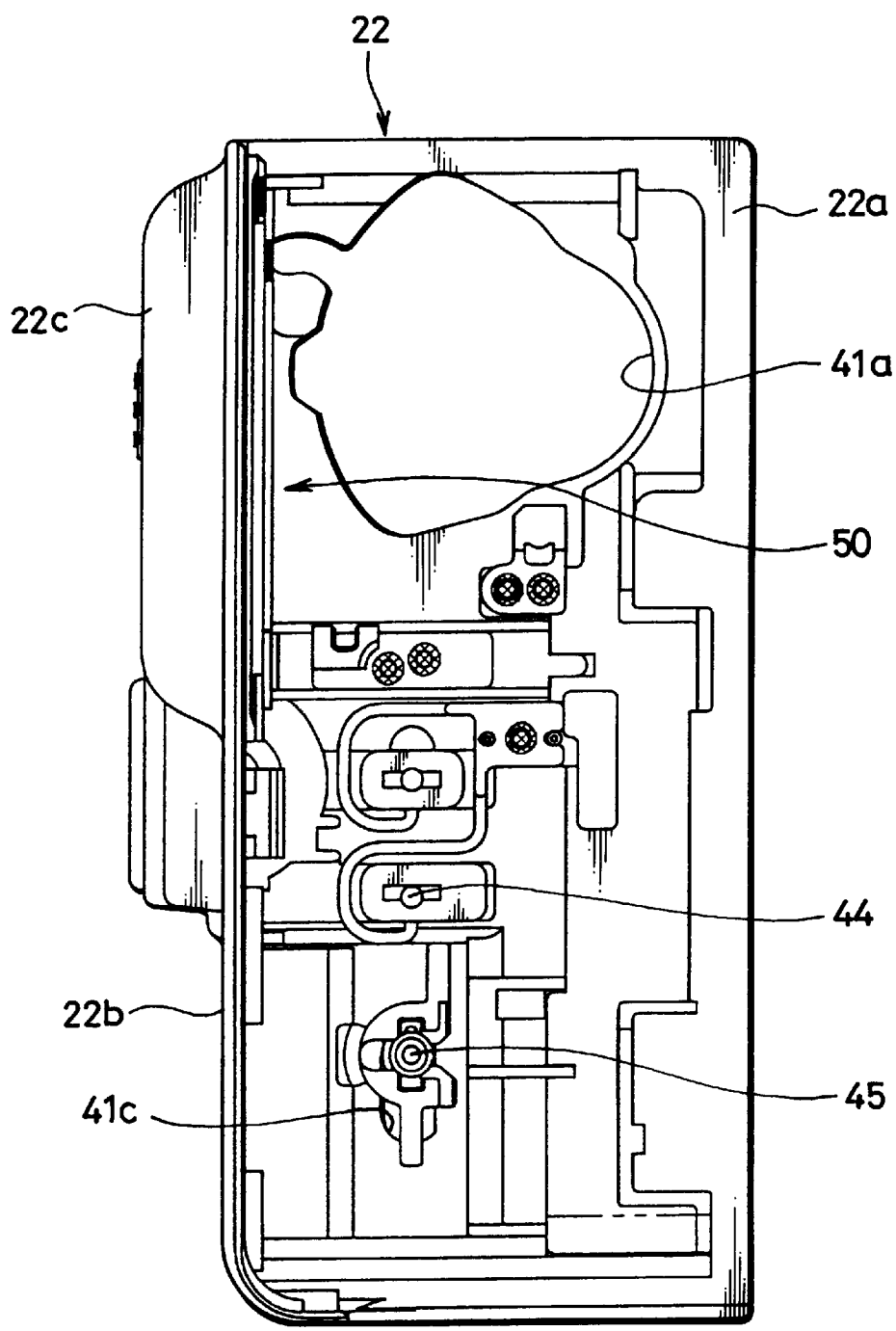
FIG. 3 is a back view of the apparatus cover according to the electronic apparatus of the present invention.
Figure 4:
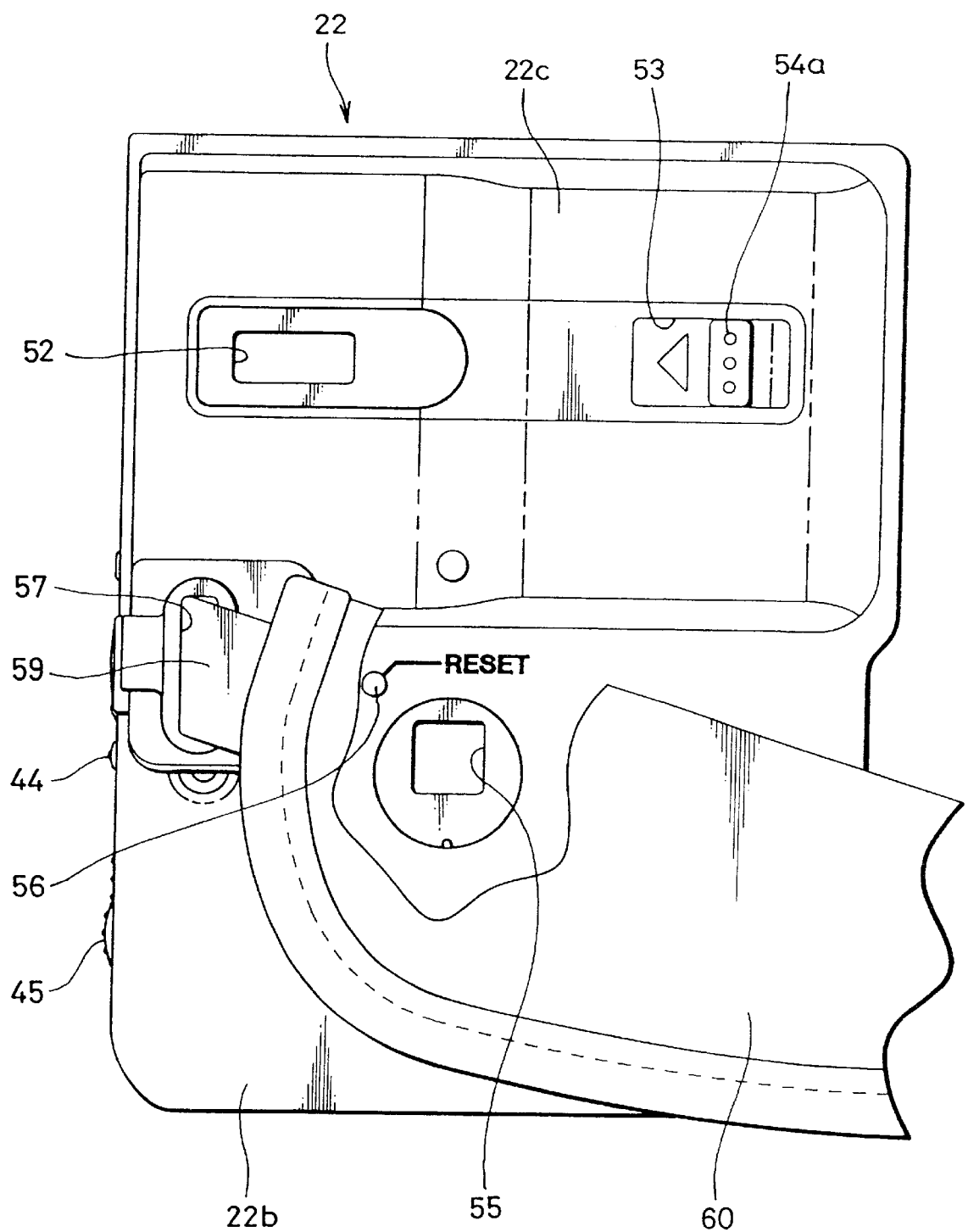
FIG. 4 is a right side view of the side surface of the equient cover according to the electronic apparatus of the present invention.
Figure 5:
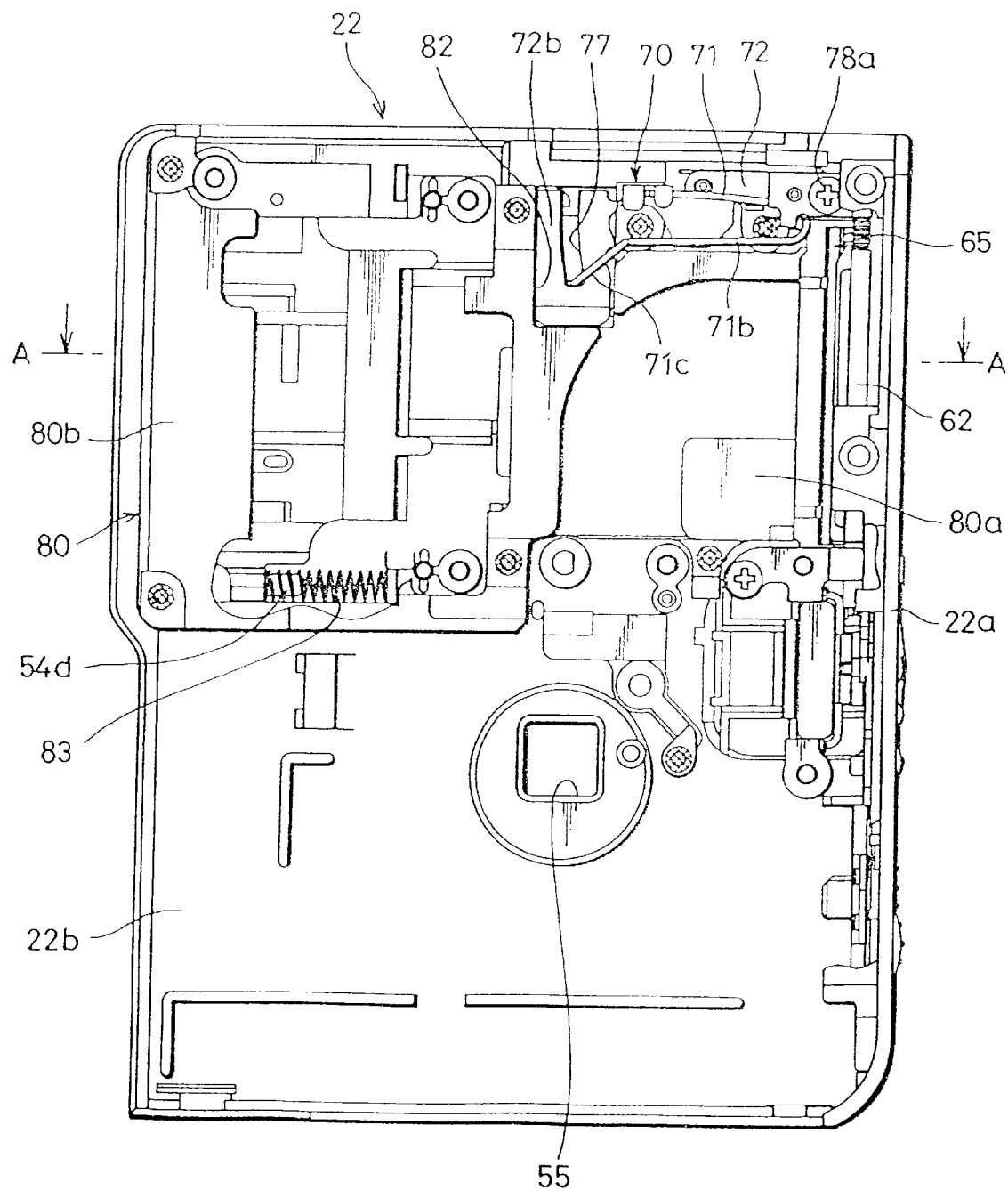
FIG. 5 is a left side view of the apparatus cover according to the electronic apparatus of the present invention.
Figure 6:
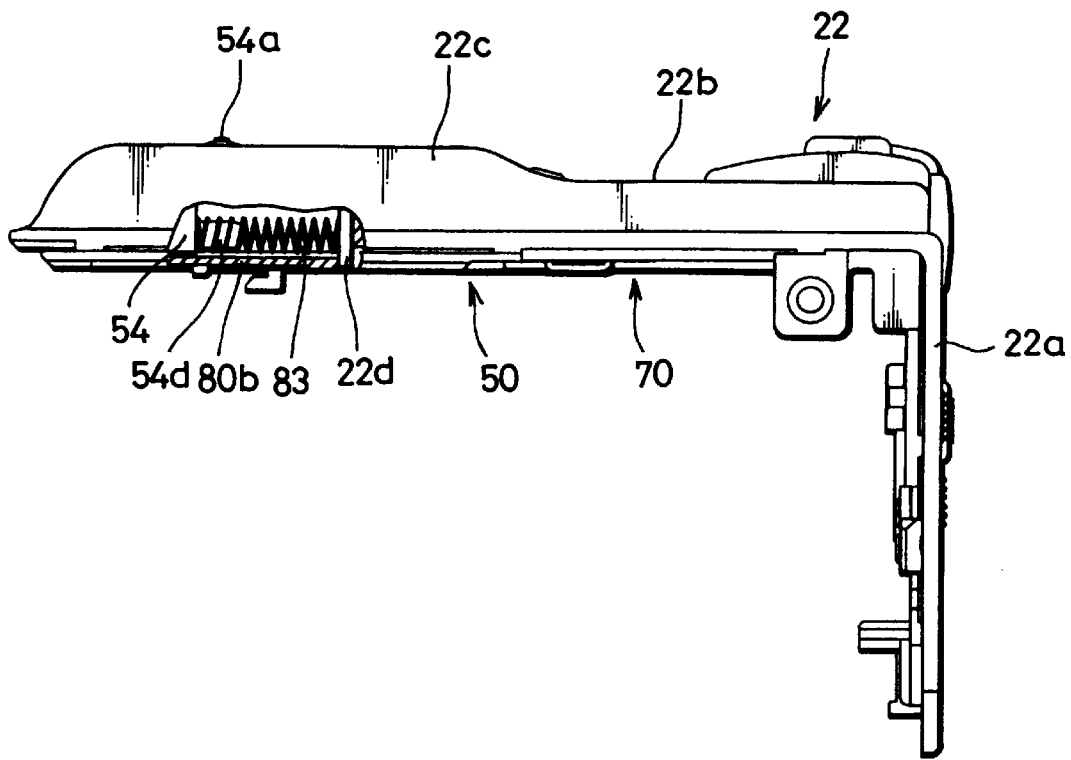
FIG. 6 is a plan view of the apparatus cover according to the electronic apparatus of the present invention while showing the cross section of part of the apparatus cover.
Figure 7:
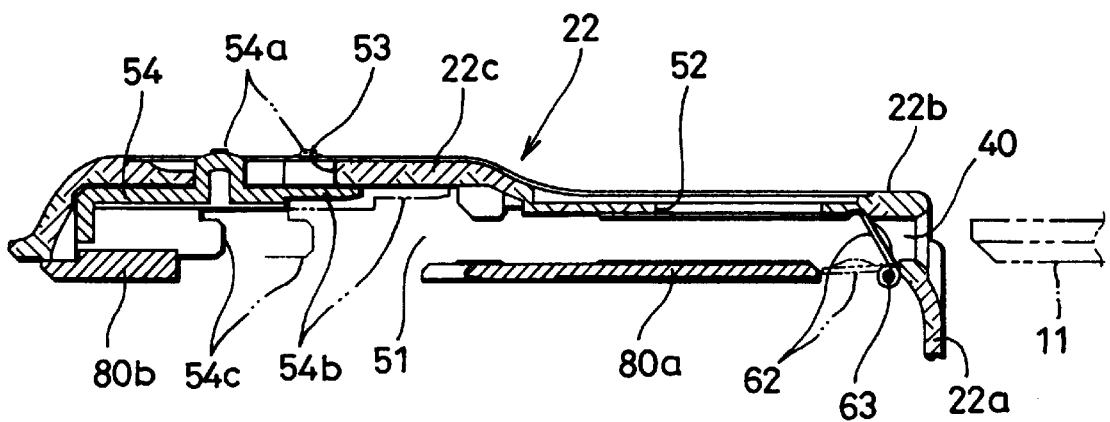
FIG. 7 is a cross-sectional view of the apparatus cover according to the electronic apparatus of the present invention while being taken along line A—A shown in FIG. 5.
Figure 8:
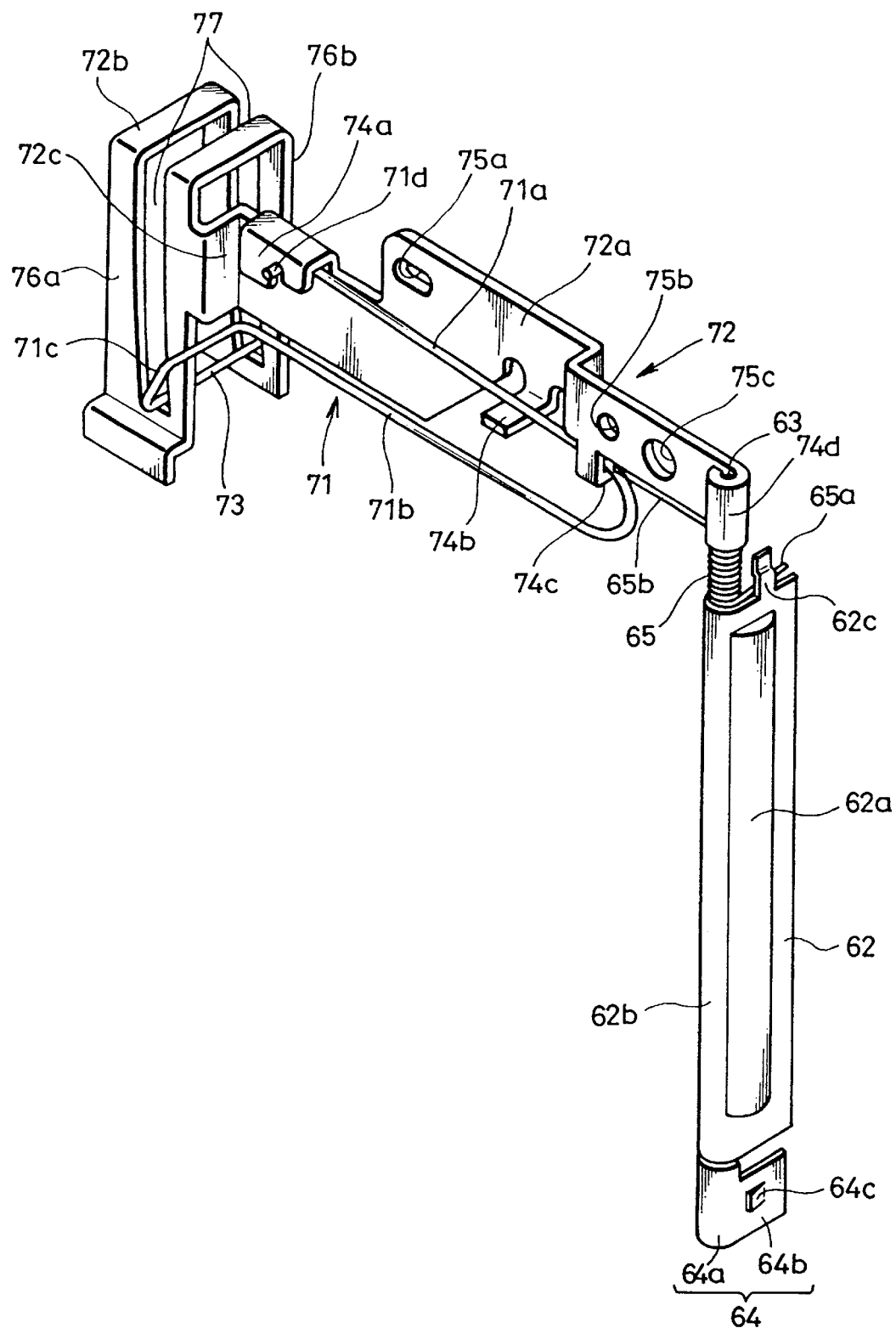
FIG. 8 is a perspective view showing an erroneous insertion preventive mechanism according to the electronic apparatus of the present invention.
Figure 12:
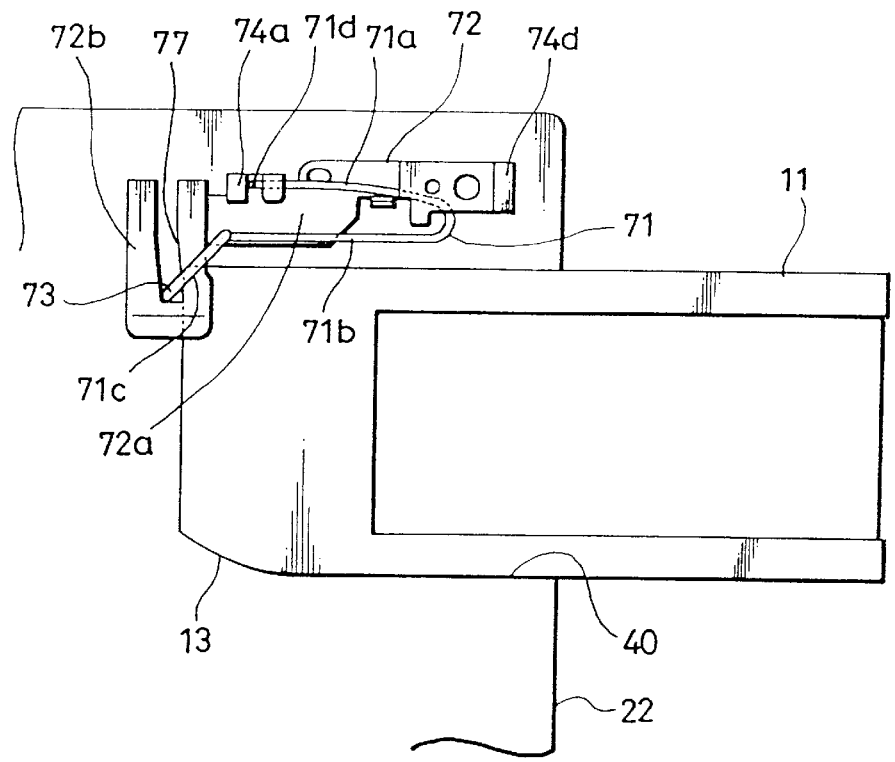
FIG. 12 shows the operation of the erroneous insertion preventive mechanism according to the electronic apparatus of the present invention and is a side view of a first example of the erroneous insertion preventive mechanism when the information recording medium is inserted in a wrong state.
Figure 13:
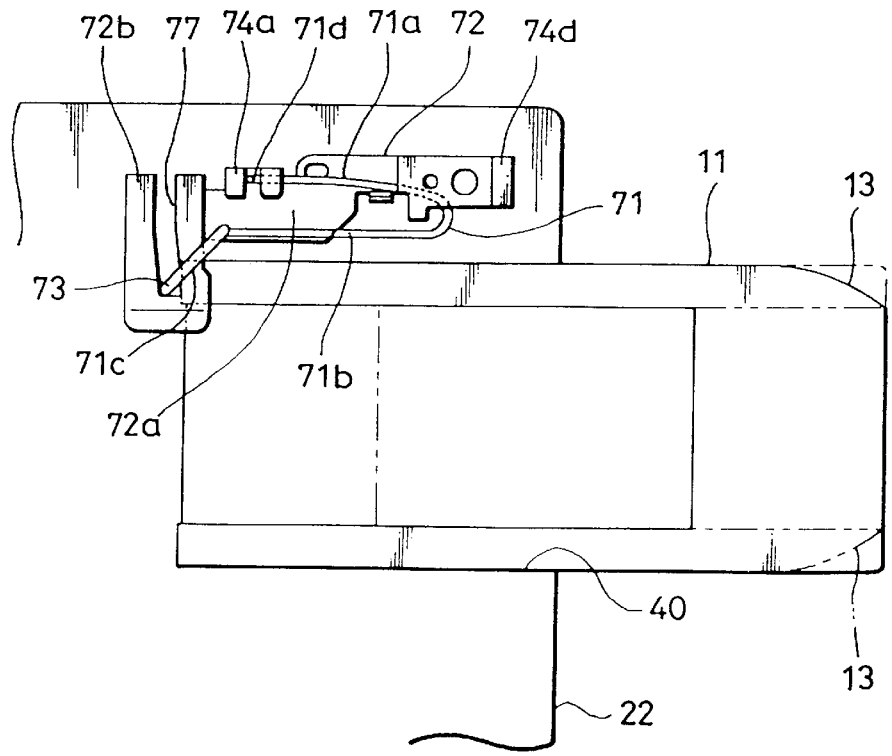
FIG. 13 shows the operation of the erroneous insertion preventive mechanism according to the electronic apparatus of the present invention and is a side view of a second example of the erroneous insertion preventive mechanism when the information recording medium is inserted in a wrong state.
Figure 14A:
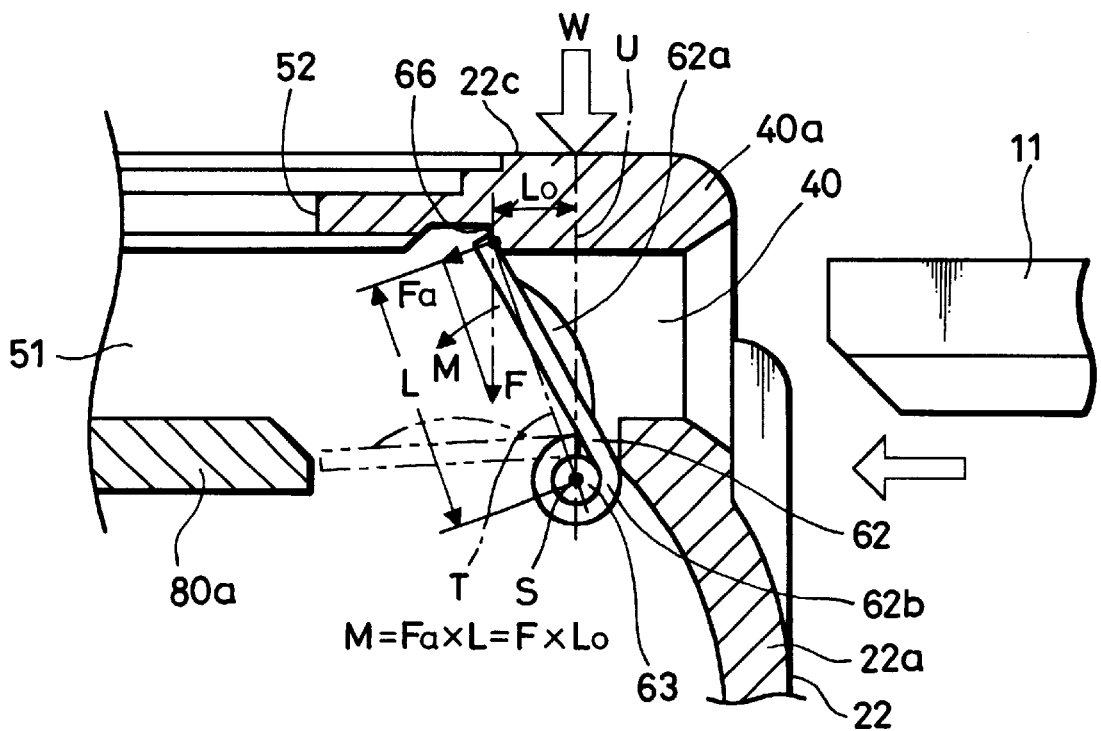
FIG. 14 shows a first example of an opening/closing door for opening and closing a recording medium insertion port according to the electronic apparatus of the present invention; A is a cross-sectional view of the opening/closing door in an ordinary state and B is a cross-sectional view thereof in a state in which the recording medium insertion port is folded.
Figure 14B:
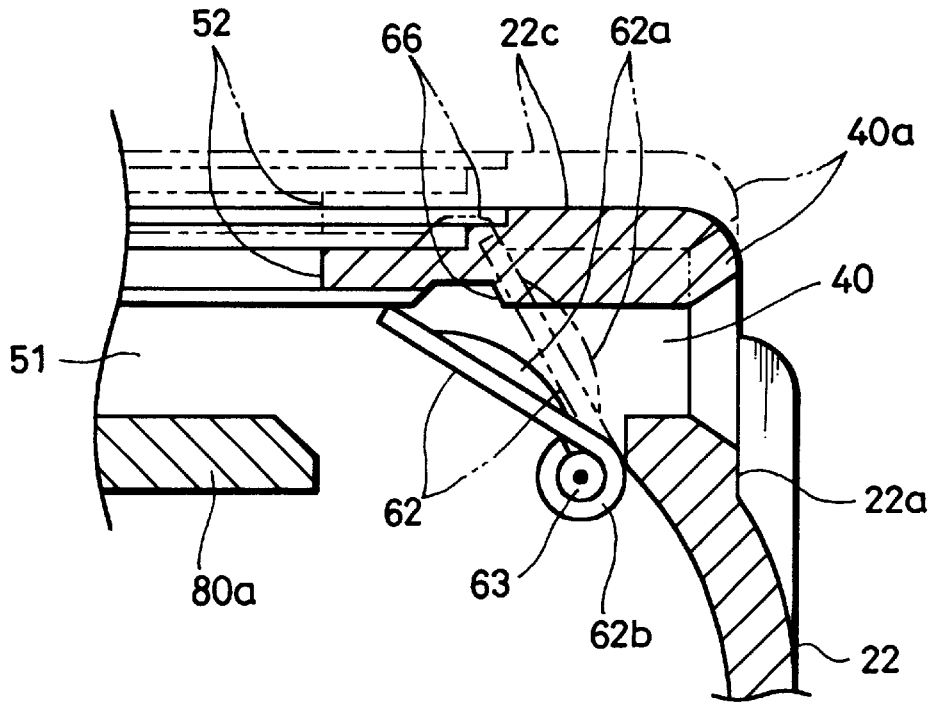
Figure 15:
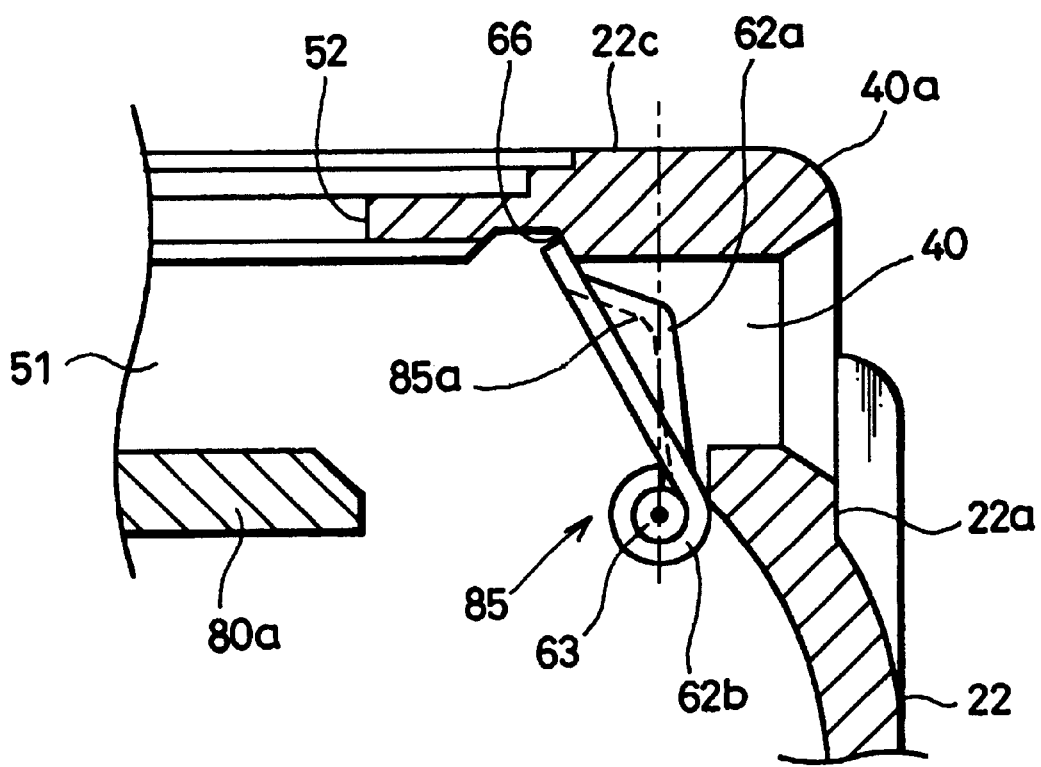
FIG. 15 is a cross-sectional view showing a second example of the opening/closing door for opening and closing the recording medium insertion port according to the electronic apparatus of the present invention.
Figure 16A:
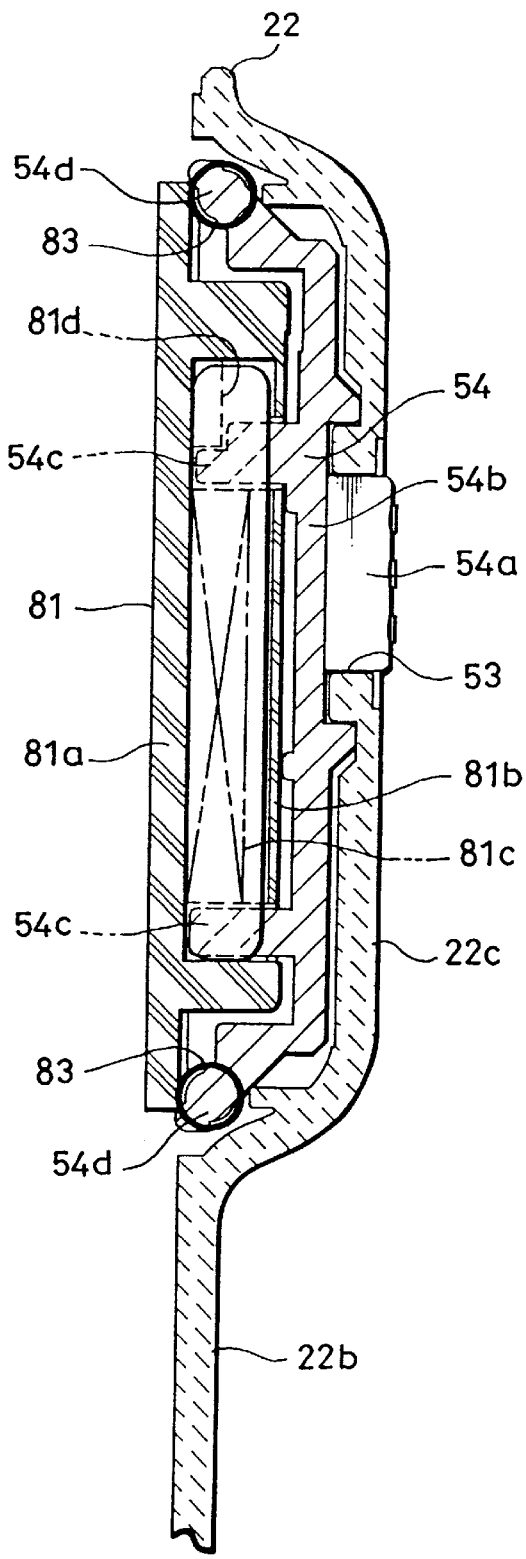
FIG. 16 shows an MS eject member according to the electronic apparatus of the present invention; A is a cross-sectional view of the MS eject member in a state in which the MS eject member is stored in a recording medium storage section and B is a front view thereof.
Figure 16B:
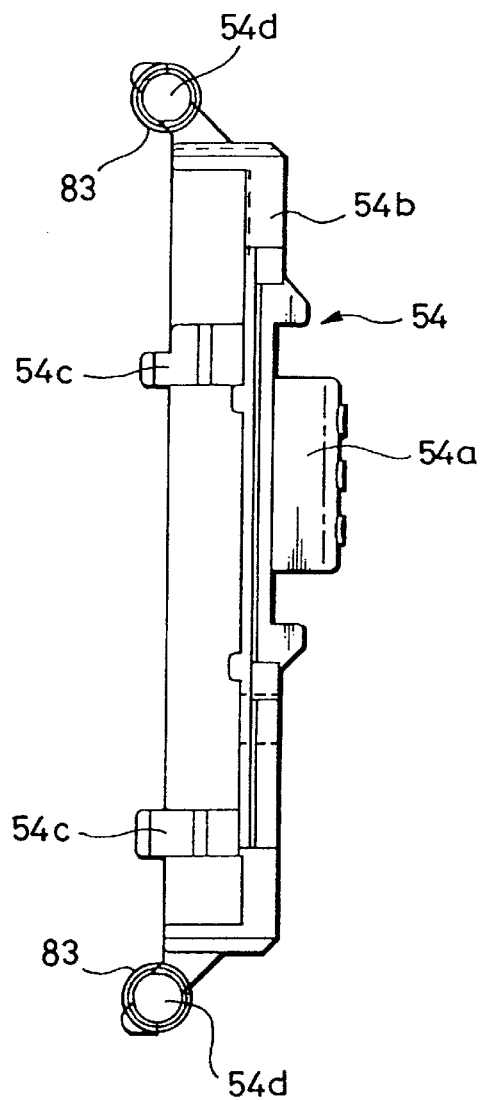
Figure 19:
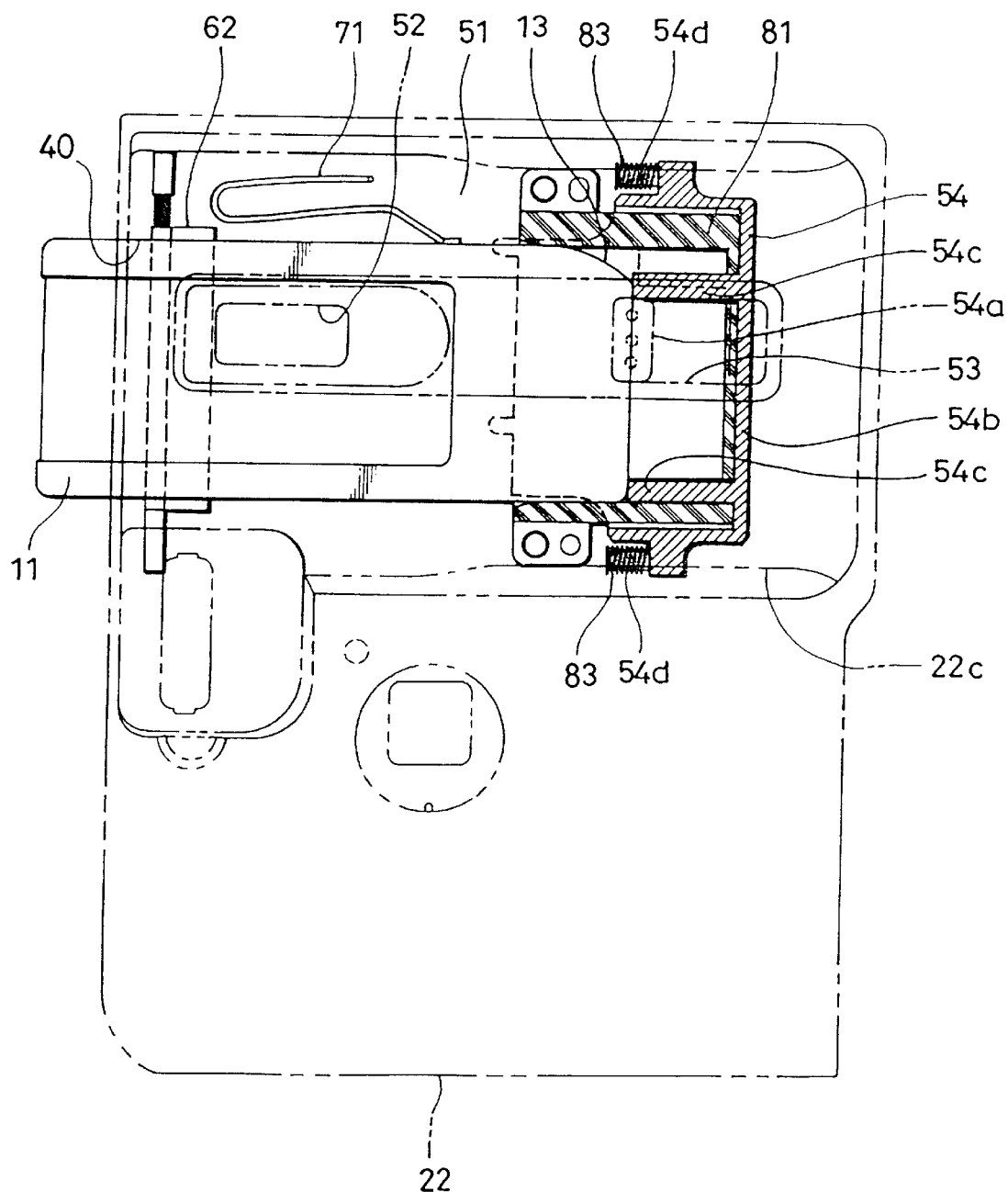
FIG. 19 shows the recording medium storage section according to the electronic apparatus of the present invention and is an explanatory view showing the state of the recording medium storage section after the information recording medium is extruded.

Specifically, FIG. 1 is a perspective view showing a camera integral type VTR according to one embodiment of the present invention, FIG. 2 is a front view showing an apparatus housing assembly of the camera integral type VTR shown in FIG. 1, FIG. 3 is a back view of FIG. 2, FIG. 4 is a right side view of FIG. 2, FIG. 5 is a left side view of FIG. 2, FIG. 6 is a plan view of FIG. 2, FIG. 7 is a cross-sectional view taken along line A—A of FIG. 5, FIG. 8 is a perspective view showing an erroneous insertion preventive mechanism used in the camera integral type VTR, FIG. 9 is a front view of the erroneous insertion preventive mechanism, FIG. 10 is a plan view of the erroneous insertion preventive mechanism, FIG. 11 is a side view enlarging the important parts of the erroneous insertion preventive mechanism, FIGS. 12 and 13 are explanatory views for the erroneous insertion preventive mechanism showing a state in which an information recording medium is erroneously inserted, FIGS. 14A and 14B are explanatory views for showing cross sections of a recording medium insertion port and an opening/closing door of the camera integral type VTR, FIG. 15 is a cross-sectional view showing another embodiment of the opening/closing door, FIG. 16 is a longitudinal sectional view showing a recording medium storage section and a side view showing an eject knob, FIGS. 17A and 17B are cross-sectional views showing the recording medium storage section, FIG. 18 is an explanatory view showing a state in which the information recording medium is stored in the recording medium storage section, FIG. 19 is an explanatory view showing a state in which the information recording medium has been taken out of the recording medium storage section and FIG. 20 is a perspective view and a plan view showing the information recording medium.

First, a memory stick 11 showing one embodiment of the information recording medium will be described. This memory stick 11 is an IC recording medium capable of storing data such as images and voices. A camera integral type VTR corresponding to this memory stick 11 can record a plurality of still images. In addition, the still image data recorded on the memory stick 11 can be fetched into a personal computer by employing a PC card adapter for the memory stick 11.

Figure 20A:
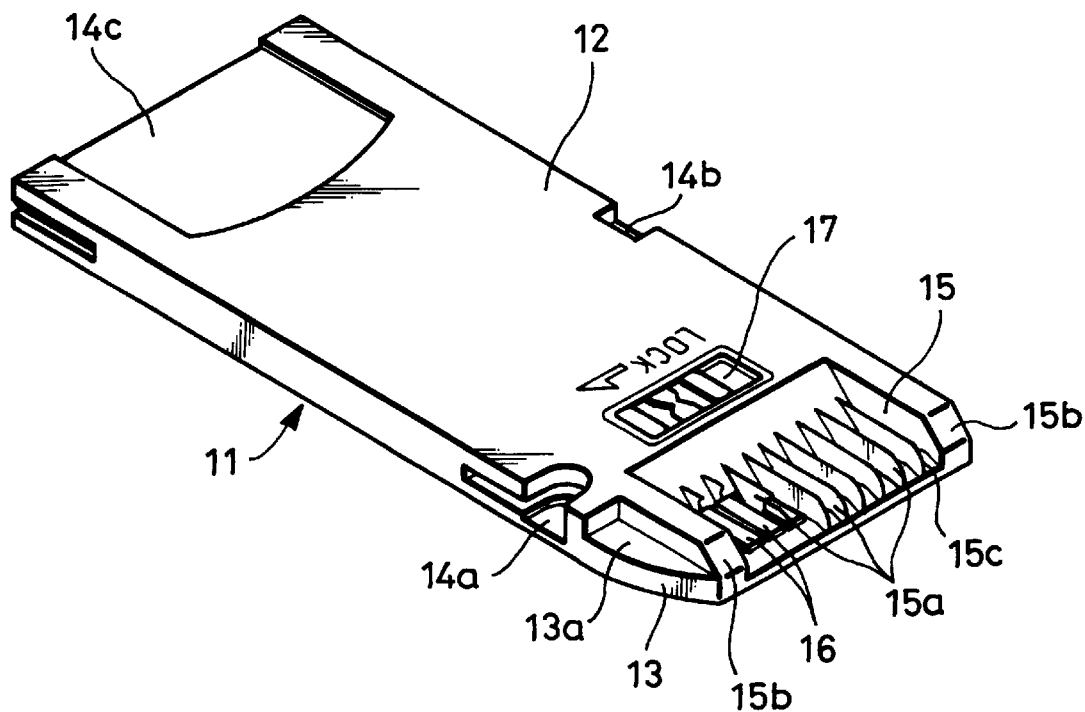
FIG. 20 shows one embodiment of the information recording medium used for the electronic apparatus of the present invention; A is a perspective view seen from a back surface side and B is a plan view seen from a front surface side.
Figure 20B:
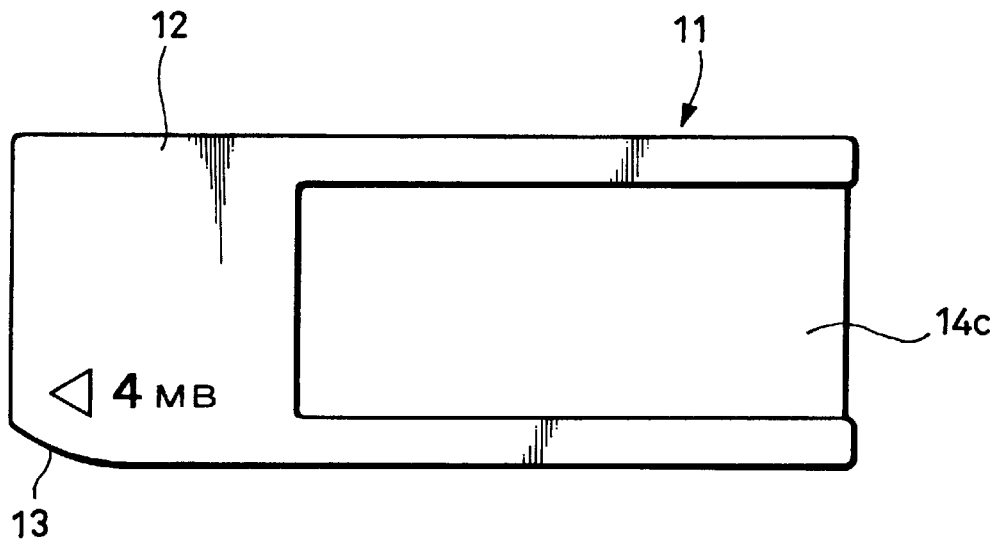
Figure 21A:
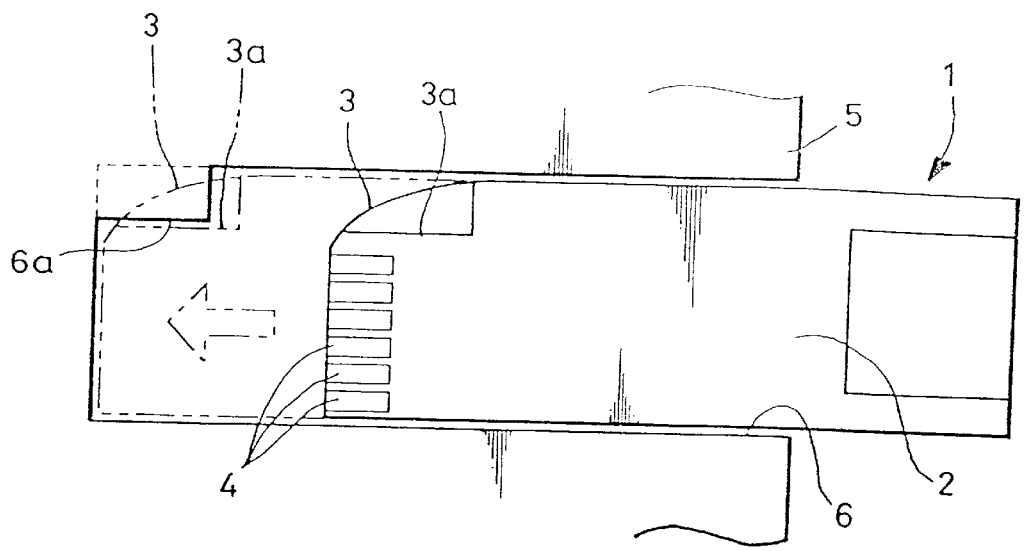
FIG. 21 shows an erroneous insertion preventive mechanism according to an electronic apparatus of prior art; A is a side view thereof in a correct insertion state, B is a plan view thereof in the correct insertion state and C is a side view thereof in an erroneous insertion state.
Figure 21B:
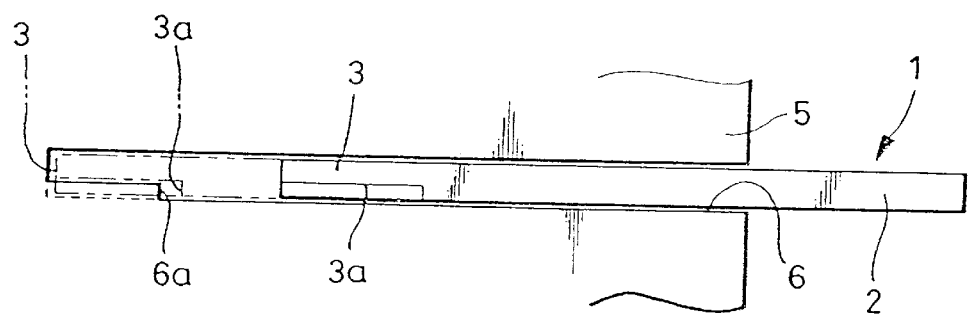
Figure 21C:
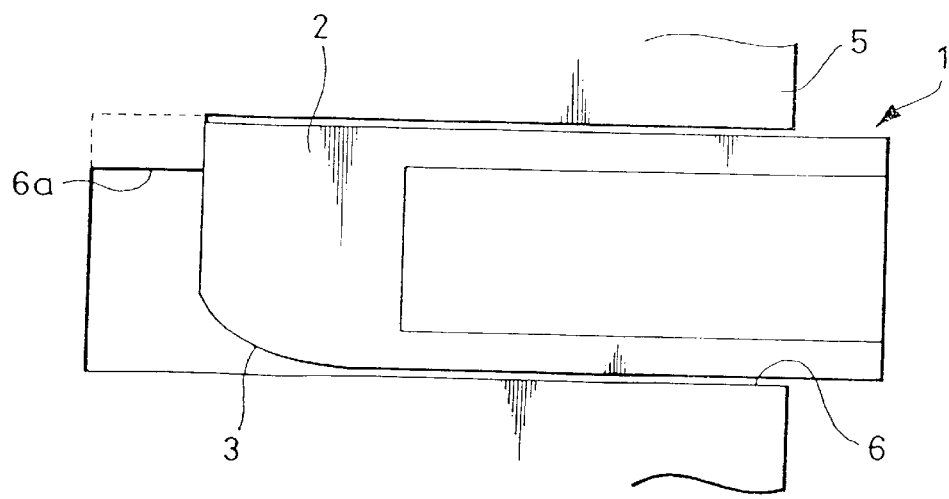

This memory stick 11 has an outline as shown in FIGS. 20A and 20B. Namely, the memory stick 11 has a case main body 12 consisting of a generally rectangular, thin, flat housing. A memory of mass storage capacity is included inside the case main body 12. A suited material for the case main body 12 may be, for example, plastics. A notch portion 13 for preventing the memory stick 11 from being erroneously inserted, is provided in one of corners at a tip end side in longitudinal direction which becomes an insertion direction in which the case main body 12 is inserted into an electronic apparatus.

The notch portion 13 of this memory stick 11 is formed into a concave circular arc. A concave portion 13a opened forward and laterally is provided on one surface of the case main body 12 of the notch portion 13. This concave portion 13a is provided to position the memory stick 11 at a predetermined position of a recording medium storage section provided at the electronic apparatus. When the memory stick 11 is stored in the recording medium storage section in a normal state, a convex portion provided at the predetermined position of the recording medium storage section is engaged with the concave portion 13a of the memory stick 11, thereby positioning the memory stick 11. Further, concave portions 14a and 14b opened laterally are provided on both sides in width direction, respectively on the same surface of the case main body 12 on which the concave portion 13a is provided. These concave portions 14a and 14b are provided to position the memory stick 11, to detect the state of the memory stick 11 or the like.

Additionally, a terminal connection section 15 opened forward and in the same surface as that on which the concave portion 13a is provided on the longitudinal tip end portion of the case main body 12. This terminal connection section 15 is equidistantly partitioned by a plurality of partition pieces 15a in width direction. The tip end portions of connector pins 16 are exposed to segments partitioned by these partition pieces 15a, respectively. Therefore, the plural connector pins 16 are arranged laterally and the other end portions thereof are electrically connected to a memory in the case main body 12. These connector pins 16 are individually connected to apparatus main body-side terminals inserted from forward when the memory stick 11 is installed at the electronic apparatus. To facilitate the connection with these apparatus main body-side terminal section, the tip end corners of the terminal connection section 15 and those of the partition pieces 15a are provided with chamfers 15b and 15c, respectively.

Also, an erroneous erase prevention switch 17 is provided inside the terminal connection section 15 so as to prevent the erroneous erase of the information recorded on the included memory. As shown in FIG. 20A, the erroneous erase prevention switch 17 is slid in an arrow direction, thereby activating an erroneous erase preventive function and preventing new information from being recorded on the memory. On the other hand, the erroneous erase prevention switch 17 is slid in the opposite direction to the arrow direction, the erroneous erase preventive function is released and new information can be recorded on the memory. It is noted that a shallow concave portion 14c onto which a label is put is provided on the surface of the case main body 12.

The camera integral type VTR 20 for which the memory stick 11 having the above-stated configuration can be used is configured to be capable of simultaneously using two types of information recording mediums. That is, one of the information recording mediums is the above-stated memory stick 11 and the other is a tape cassette used to record image information. This camera integral type VTR 20 has a configuration as shown in FIG. 1.

As shown in FIG. 1, the camera integral type VTR 20 is comprised of an apparatus main body 21, an apparatus cover 22 for opening and closing the opening portion of this apparatus main body 21, a liquid crystal monitor 23 provided at the apparatus main body 21 so that the posture is freely changeable and serving as a display unit, and the like. The apparatus main body 21 consists of a longitudinally elongated, generally rectangular housing. The upper portion of the apparatus main body 21 mainly stores a camera block and the lower portion thereof stores a VTR block.

That is to say, the lens section of the camera block is arranged in the upper portion of the apparatus main body 21. One end of this lens section serves as an objective lens and exposed to a one surface side of the apparatus main body 21 in width direction. A color view finder 25 is attached to the other surface side of the apparatus main body 21 in width direction to protrude laterally. On the upper surface of the apparatus main body 21, a microphone 26 and an accessory shoe 27 are attached. Furthermore, a monitor concave portion 28 is provided at one side on the upper portion of the apparatus main body 21 in thickness direction. A pair of upper and lower monitor support portions 29, 29 are provided at the objective lens side of the monitor concave portion 28 for supporting the liquid crystal monitor 23 so that the posture of the monitor 23 is freely changeable.

The paired monitor support sections 29 and 29 support the both ends of a coupling member 30, whereby the coupling member 30 is rotatable in the horizontal direction of the apparatus main body 21. This coupling member 30 pivotally supports and cantilevers a monitor holder 31 to which the liquid crystal monitor 23 is installed. Therefore, the liquid crystal monitor 23 is rotatable vertically about the coupling member 30 through the monitor holder 31. The coupling relationship between the monitor holder 31 and the coupling member 30 and that between the coupling member 30 and the apparatus main body 21 allow the posture of the liquid crystal monitor 23 to be freely changeable in vertical and horizontal directions.

A claw receiving section 31a is provided on the lower portion of the monitor holder 31. By engaging the locking claw 32 of a locking mechanism with the claw receiving section 31a, the monitor holder 31 is locked while the liquid crystal monitor 23 is stored in the monitor concave portion 28. The locking and unlocking operations of the locking claw 32 are carried out by operating an unlock button 33 held by the apparatus main body 21. A battery storage section 34 is provided at the apparatus main body 21 below the locking claw 32. A battery pack 35 which can be repeatedly used by charging batteries is detachably installed into this battery storage section 34. Also, a speaker hole 36 is provided on the side surface of the battery storage section 34 of the apparatus main body 21 and a speaker is included in the speaker hole 36.

The mechanical deck section, though not shown, of the VTR block is included in the lower portion of the apparatus main body 21. To expose the upper and front surfaces of this mechanical deck section, an opening portion is provided on the lower portion of the apparatus main body 21. The opening portion is freely opened and closed by the apparatus cover 22. A VTR circuit section is attached to the mechanical deck section and fixed to the inner surface of the apparatus main body 21 which is a frame section. Part of operation buttons 38 for operating this mechanical deck section are arranged on the side surface of the monitor concave portion 28. Inside of the operation buttons 38, the camera circuit section, the photoelectric conversion section and the like of the camera block are disposed.

The apparatus cover 22 is rotatably coupled to the apparatus main body 21 by coupling means such as hinges. The rotating operation of this apparatus cover 22 is cooperated with the operation of the cassette holder of the mechanical deck section. By opening the apparatus cover 22 and the opening portion of the apparatus main body 21, the cassette holder of the mechanical deck section is moved and the cassette insertion port thereof is opened. This allows a tape cassette to be installed in the cassette holder or a tape cassette installed in the cassette holder in advance to be taken out of the holder.

The apparatus cover 22 for opening and closing the opening portion of the apparatus main body 21 is configured as shown in FIGS. 2 to 7. That is, the apparatus cover 22 consists of a back surface portion 22a covering the back side of the opening portion of the apparatus main body 21 and a side surface portion 22b covering the side surface side of the opening portion thereof and has a L-shaped flat shape as a whole. The back surface portion 22a of this apparatus cover 22 is provided with a recording medium insertion port 40 for taking in and out the memory stick 11 as shown in FIG. 2. Further, through holes 41a, 41b and 41c into which various types of buttons and knobs are installed, are provided on the back surface portion 22a.

The through hole 41a provided on the upper portion of the back surface portion 22a of the apparatus main body 22 is in the form of a fan opened laterally. A mode change-over switch 42 is rotatably installed into the through hole 41a and a recording button 43 is installed at the rotation center of the switch 42. The through hole 41b provided on the middle portion of the back surface portion 22a is a laterally elongated hole into which a screen display button 44 is installed. In addition, the through hole 41c provided on the lower portion of the back surface portion 22a is a vertically elongated hole into which the knob of a cover eject member 45 is installed. This cover eject member 45 is slid downward and the locking state of a cover locking mechanism is released, whereby the apparatus cover 22 can be opened and the cassette insertion port of the mechanical deck section can be opened.

Furthermore, the upper portion of the side surface portion 22b of the apparatus cover 22 is formed to bulge outward. A recording medium installation mechanism 50 to which the memory stick 11 is detachably installed, is provided inside of the bulge portion 22c of the apparatus cover 22. This recording medium installation mechanism 50 is configured to be almost contained in the bulge portion 22c as shown in FIGS. 3 to 6. A recording medium storage section 51 in which the memory stick 11 is stored is provided inside this recording medium installation mechanism 50. As shown in FIG. 7, a recording medium insertion port 40 opened in the back surface portion 22a of the apparatus cover 22 is communicated with one side of the recording medium storage section 51.

A memory stick observation window (to be referred to as "MS observation window" hereinafter) 52 is provided at the bulge portion 22c of the side surface portion 22b of the apparatus cover 22 to observe the recording medium storage section 51 as shown in FIG. 4. The memory stick 11 stored in the recording medium storage section 51 is provided to face this MS observation window 52. Due to this, by observing the section 51 through the MS observation window 52, it is possible to know whether or not the memory stick 11 is present. Moreover, a knob hole 53 for taking out the memory stick 11 of the recording medium storage section 51 is provided at almost the same level as that of the MS observation window 52 on the bulge portion 22c. The knob 54a of the memory stick eject member (to be referred to as "MS eject member" hereinafter) 54 is slidably inserted into the knob hole 53.

A tape cassette observation window (to be referred to as "TC. observation window" hereinafter) 55 for observing the mechanical deck section is provided on almost the central portion of the side surface portion 22b of the apparatus cover 22. By observing the mechanical deck section through this TC observation window 55, it is possible to know whether a tape cassette is installed in the mechanical deck section. A reset switch 56 is arranged off to the upward of the TC observation window 55. Further, a vertically extending through hole 57 is provided on the rear portion of the side surface portion 22b. A buckle 58 is inserted into the through hole 57 and one end of an attachment belt 59 is fixed to the buckle 58. The other end of the attachment belt 59 is fixed to a buckle, though not shown, attached to the apparatus main body 21. This attachment belt 59 is penetrated into a grip cover 60. The grip cover 60 and the attachment belt 59 constitutes a grip belt.

The recording medium insertion port 40 of this apparatus cover 22 consists of a rectangular opening elongated vertically. As shown in FIG. 7, a opening/closing door 62 is arranged inside of the recording medium insertion port 40. As shown in FIG. 8, the opening/closing door 62 consists of a rectangular plate formed to be elongated vertically so that the door 62 can cover the recording medium insertion port 40 from inside. A barrel guide protrusion 62a having a vertically continuous circular arc shape is provided on the central portion of this opening/closing door 62. This guide protrusion 62a is formed to be slightly smaller than the recording medium insertion port 40 and set so that the entire guide protrusion 62a may face the interior of the recording medium insertion port 40.

A cylindrical portion 62b formed by rolling the end portion of the opening/closing door 62 into a cylindrical shape along longitudinal direction is provided at one side of the door 62 in width direction thereof. A support shaft 63 is inserted into the cylindrical portion 62b and the both ends of the shaft 63 protrude from the cylindrical portion 62b. A bearing member 64 is attached to the lower protruding portion of the support shaft 63. The bearing member 64 has a bearing portion 64a to which the lower protruding portion of the support shaft 63 is fixed and a fixed piece 64b formed integrally and continuously with this bearing portion 64a. An elastic piece 64c is provided on almost the central portion of the fixed piece 64b. This elastic piece 64c is formed by cutting three segments and folding out a free end side.

The coil portion of a twisted coil screw 65 is loosely fitted into the upper protruding portion of the support shaft 63. One spring piece 65a continuous to the coil portion of the twisted coil spring 65 is stopped by a spring receiving piece 62c provided on the upper end portion of the opening/closing door 62. The other spring piece 65b continuous to the coil portion of the twisted coil spring 65 is stopped by a support member 66. Urged by the spring force of this twisted coil spring 65, the opening/closing door 62 closes the recording medium insertion port 40 from inside. At this moment, the opening/closing door 62 is attached to be inclined toward the recording medium insertion port 40.

In other words, the attachment position of the support shaft 63 is set inside the recording medium insertion port 40 and a door receiving surface 66 with which the free end of the opening/closing door 62 is press-contacted is provided on the back side of the bulge portion 22c of the side surface portion 22b. As shown in the enlargement view of FIGS. 14A and 14B, the door receiving portion 66 is set at a position deeper than a distance from the front surface of the recording medium insertion port 40 to the support shaft 63. By so setting, a plane T connecting the door receiving surface 66 and the center of the support shaft 63 (rotation center S of the opening/closing door 62) is not aligned linearly with a parallel plane U passing through the rotation center S and parallel to the front surface of the recording medium insertion port 40.

With the above configuration, an external force W is applied to the outer edge 40a of the recording medium insertion port 40. Even if the outer edge 40a is bent to narrow the recording medium insertion port 40, the door receiving surface 66 can apply a rotation force to the opening/closing door 62. As a result, the external force W applies a rotation force to the opening/closing door 62 and the free end side of the opening/closing door 62 can be escaped from the door receiving surface 66. Thus, it is possible to prevent the opening/closing door 62 and/or the support shaft 63 from being deformed or damaged due to the bending of the outer edge 40a of the recording medium insertion port 40.

The rotation force of the opening/closing door 62 applied from the external force W can be calculated as follows. If it is assumed that a distance from the contact center of the door receiving surface 66 to the rotation center S of the opening/ closing door 62 is L, a vertical distance from the contact center of the door receiving surface 66 to the parallel plane U is Lo, a force applied to the opening/closing door 62 based on the external force W and acting on a direction parallel to the parallel plane U is F, a force acting on a direction perpendicular to the plane T of the force F is Fa and a moment acting on the opening/closing door 62 is M, then the following expression is obtained:

$$M = Fa Å{\sim}L \text{ or } M = F Å{\sim}Lo.$$

Accordingly, a moment of M=Fa Å~L=F Å~Lo acts on the opening/closing door 62. The opening/closing door 62 is rotated by the moment M counterclockwise in FIG. 14. The state of the door 62 in FIG. 14A is changed to that in FIG. 14B, whereby the free end of the door 62 escapes from the door receiving surface 66.

An erroneous insertion preventive mechanism 70 for preventing the erroneous insertion of the memory stick 11 is provided deep inside of such an opening/closing door 62 on the upper portion of the recording medium storage section 51. This erroneous insertion preventive mechanism 70 consists of an elastic spring member 71 and a support member 72 supporting this spring member 71. The spring member 71 has a pair of spring pieces 71a and 71b facing each other by bending the spring member 71 into a U-shape and a stopper piece 71c continuous to the tip end portion of one spring piece 71b and bent into a U-shape. One piece on the tip end of the bus stopper piece 71c of the spring member 71 constitutes a stopper section protruding forward in the insertion direction of the memory stick 11.

The support member 72 is provided with a fixed portion 72a for supporting one end of the spring member 71, a support portion 72b provided continuously to one end of the fixed portion 72a and a coupling portion 72c for coupling the support portion 72b with the fixed portion 72a. The fixed portion 72a of the support member 72 is extended laterally and is provided with three support claws 74a, 74b and 74c for supporting one spring piece 71a of the spring member 71 and a bearing portion 74d for fixing and supporting the upper protruding portion of the above-stated support shaft 63. A plurality of positioning holes 75a and 75b and a screw hole 75c are provided at the fixed portion 72a. The bearing portion 74d is formed by rolling the end portion of the fixed portion 72a most distant from the support portion 72b into a cylindrical shape.

Furthermore, the three support claws 74a, 74b and 74c of the fixed portion 72a are arranged to be aligned laterally. The first support claw 74a close to the support portion 72b is of a U-shape opened downward, whereas the central, second support claw 74b and the third support claw 74c most distant from the support portion 72b are L-shaped. The second and third support claws 74b and 74c are provided to face inside of the mutual claws and the first spring piece 71a is inserted between the support claws 74b and 74c. A claw portion 71d bent at right angle is provided on the tip end of the first spring piece 71a. The claw portion 71d is stopped by a stopper groove provided in the first support claw 74a, thereby attaching the spring member 71 to the support member 72.

The support portion 72b of the support member 72 consists of a U-shaped plate opened downward, by which a pair of support pieces 76a and 76b facing each other laterally are provided. The paired support pieces 76a and 76b are provided with a guide groove 77 in which the pieces 76a and 76b overlap each other and which opens upward. This guide groove 77 is in the form of a circular arc by a radius of curvature almost the same as a length from the rocking center of the second spring piece 71b of the spring member 71 to the stopper portion 73. The stopper portion 73 of the spring member 71 is inserted into this guide groove 77 and the tip end of the stopper portion 73 is bent into an L-shape so that the stopper portion 73 is not detached from the guide groove 77. Thus, the stopper portion 73 is always urged against the bottom of the guide groove 76 by the elastic force of the spring member 71 itself.

The support member 72 of this type is arranged on the upper portion of the recording medium storage section 51 to stride the upper portion of the inserted memory stick 11, as shown in FIG. 5. The support member 72 is positioned at a predetermined position of the apparatus cover 22 by positioning pins inserted into the positioning holes 75a and 75b, respectively and fixed by an attachment screw 78a inserted into the screw hole 75c. Besides, the upper end portion of the support shaft 63 which pivotally supports the opening/ closing door 62 is fixed to the bearing portion 74d provided at this support member 72.

The recording medium storage mechanism 50 having the erroneous insertion preventive mechanism 70 configured as stated above and attached to the recording medium insertion port 40-side upper portion, is provided with a recording medium holder 80, a connection terminal holder 81 and the above-stated MS eject knob 54. The recording medium holder 80 has a holder portion 80a into which the memory stick 11 is inserted, a frame-like frame portion 80b continuous to one side of this holder portion 80a and surrounding the terminal connection section 15 of the inserted memory stick 11. The holder portion 80a consists of a part having a U-shaped cross section opened to one side surface. A notch portion 82b in which the support portion 72b of the support member 72 is arranged is provided on one upper side of the holder portion 80a.

The frame portion 80b of the recording medium holder 80 consists of a generally tetragonal frame. A plurality of parts of the frame portion 80b and the holder portion 80a are caulked to thereby fix the recording medium holder 80 to the inside of the bulge portion 22c on the side portion 22b of the apparatus cover 22. The connection terminal holder 81 is fitted into the opening portion of the frame portion 80b and fixed to the inside of the bulge portion 22c by fixation means such as attachment screws.

The connection terminal holder 81 has a holder base 81a having a U-shaped cross section and formed to match to the opening portion of the frame portion 80b, and a holder cover 81b covering the opening side of the holder base 81a. The holder base 81a of the connection terminal holder 81 is provided with a terminal section 81c having the same number of terminals as that of the connector pins 16 provided at the memory stick 11. Further, the holder base 81a is provided with a convex portion 81d engaged with the concave portion 13a provided at the notch portion 13 of the memory stick 11. This convex portion 81d is to position the memory stick 11 installed in the recording medium storage section 51, and the concave portion 13a is completely engaged with the convex portion 81d, thereby positioning the memory stick 11 at a predetermined position and connecting the connector pins 16 to the terminals of the terminal section 81c.

As shown in FIGS. 7, 16A, 17A and 17B, an MS eject member 54 is slidably stored between the connection terminal holder 81 and the bulge portion 22c of the apparatus cover 22. This MS eject member 54 is provided with the above-stated operating portion 54a, a member main body 54b capable of covering the holder cover 81b side of the connection terminal holder 81, a pair of extrusion portions 54c ad 54c provided to protrude toward the one surface side of the member main body 54b, a pair of spring receiving pins 54d and 54d provided integrally with the outsides of the paired extrusion portions 54c and 54c, respectively. The member main body 54b is movable laterally along the inner surface of the bulge portion 22c and the operation portion 54a is penetrated through the tab hole 53 and exposed to a surface side.

As shown in FIGS. 18 and 19, the paired extrusion portions 54c and 54c of the MS eject member 54 are inserted into the connection terminal holder 81 from slits provided at the holder cover 81b. One ends of compression coil springs 83 are engaged with the paired spring receiving pins 54d and 54d, respectively. The other ends of the compression coil springs 83 are received by spring receiving pieces 22d provided in a standing manner on the inner surface of the bulge portion 22c.

The MS eject member 54 is always urged in a direction away from the recording medium insertion port 40 by the spring force of the compression coil springs 83 as shown in FIG. 18. The MS eject member 54 is slid to the recording medium insertion port 40 against the spring force of the compression coil springs 83, thereby exposing the base of the memory stick 11 from the recording medium insertion port 40 as shown in FIG. 19.

The following insertion and taking-out operations are conducted for the memory stick 11 with respect to the camera integral type VTR 20 having such a configuration. First, description will be given to a case where the memory stick 11 is installed in the recording medium storage section 51. In this case, as shown in FIGS. 9 and 10, the memory stick 11 is inserted into the recording medium insertion port 40 in a normal state.

That is, the memory stick 11 is inserted such that the terminal connection section 15 is put inside and the tip end portion having the notch portion 13 faces the recording medium insertion port 40, as shown in FIGS. 7 and 14A. Then, the memory stick 11 is inserted into the recording medium insertion port 40 from the tip end portion. At this moment, the opening/closing door 62 is arranged inside of the recording medium insertion port 40. Due to this, the tip end portion of the memory stick 11 is first abutted against the opening/closing door 62. Since this opening/closing door 62 is urged to close the recording medium insertion port 40 by the spring force of the twisted coil spring 65, the memory stick 11 is inserted against the spring force of the twisted coil spring 65 to thereby rotate the opening/closing door 62 backward.

When the memory stick 11 is inserted to a certain extent, the tip end portion of the stick 11 contacts with the stopper portion 73 of the spring member 71 of the erroneous insertion preventive mechanism 70. At this moment, since the memory stick 11 is inserted in a normal state, the circular arc surface of the notch portion 13 contacts with the stopper portion 73 designed to cross on the moving locus of the memory stick 11 as shown in FIG. 9. This stopper portion 73 can be moved in the width direction of the memory stick 11, i.e., in upward direction by the elastic force of the spring member 71 itself provided with the stopper portion 73. Accordingly, if the memory stick 11 is further pushed in, the stopper portion 73 is moved outside while being guided by the circular arc surface of the notch portion 13. Thereafter, if the stopper portion 73 passes through the notch portion 13 along the guide groove 77 and reaches the side surface of the memory stick 11, it may be slid on the side surface portion. Thus, it is possible to insert the memory stick 11 further inside.

On the other hand, if the memory stick 11 is inserted into the recording medium insertion port 40 in an abnormal state, the erroneous insertion preventive mechanism 70 operates to prevent the insertion of the memory stick 11 in the middle of the insertion operation. Here, the following three cases are meant by the insertion of the memory stick 11 in an abnormal state. First, as shown in FIG. 12, the memory stick 11 is inserted from the tip end side of the notch portion 13 with the stick 11 turned inside out. Second, as indicated by a two-dot chain line shown in FIG. 13, the memory stick 11 is inserted from the rear end side at which the notch portion 13 is not provided with the memory stick 11 put in opposite direction. Third, as indicated by a solid line shown in the slide line of FIG. 13, the memory stick 11 is inserted from the rear end side at which the notch portion 13 is not provided with the memory stick 11 turned inside out and put in opposite direction.

In any of these three aspects, the corners other than the notch portion 13 of the memory stick 11 are abutted against the stopper portion 73 of the erroneous insertion preventive mechanism 70. The corners other than the notch portion 13 are convex portions protruding at almost 90 degrees and the flat surfaces thereof extending in a direction orthogonal to the insertion direction of the memory stick 11 are engaged with the stopper portion 73. Due to this, the insertion force of the memory stick 11 acts on the stopper portion 73 only in the insertion direction and a component force toward the direction orthogonal to the insertion direction is not generated.

As a result, the stopper portion 73 is not moved upward and held on the moving locus of the memory stick 11, thereby preventing the memory stick 11 from being further inserted. As shown in FIG. 11, the force applied to the stopper portion 73 by the insertion of the memory stick 11 is supported on both ends by the edges of the guide groove 77 provided to overlap the paired support pieces 76a and 76b with each other constituting the support portion 72b of the support member 72. This makes it possible to ensure that the force applied from the memory stick 11 can be received by the stopper portion 73. Accordingly, it is possible to prevent the spring member 71 and/or the support member 72 from being deformed and damaged due to the excessive insertion force of the memory stick 11.

Next, as shown in FIG. 17A, when the memory stick 11 is inserted into a predetermined position after the notch portion 13 of the memory stick 11 has passed through the erroneous insertion detection section of the erroneous insertion preventive mechanism 70, the concave portion 13a provided at the notch portion 13 is engaged with the convex portion 81d provided at the connection terminal holder 81 of the recording medium storage mechanism 50. Then, as shown in FIG. 17B, the memory stick 11 is inserted until the concave portion 13a is surely engaged with the convex portion 81d, thereby completing the insertion operation of the memory stick 11. At this moment, the terminal connection section 15 of the memory stick 11 is connected to the terminal section 81c of the connection terminal holder 81 and electrical connection is completed, as well. As a result, an information signal can be recorded on the memory stick 11.

Next, description will be given to a case where the memory stick 11 is taken out of the recording medium storage section 51. FIG. 18 shows a state in which the memory stick 11 is installed in the recording medium storage section 51. In this case, the tip end portion of the memory stick 11 is fitted into the connection terminal holder 81 and the MS eject member 54 is moved backward by the spring force of the paired compression coil springs 83 and 83.

In this state, if the MS eject member 54 is slide by manual operation, the memory stick 11 can be taken out easily. In other words, the operation portion 54a of the MS eject member 54 exposed to the bulge portion 22c of the apparatus cover 22 is slid toward the recording medium insertion port 40. Here, as shown in FIG. 19, when the MS eject member 54 is slid against the spring force of the compression coil springs 83, the paired extrusion portions 54c and 54c are abutted against the tip end portion of the memory stick 11. Then, the memory stick 11 is extruded by a force for moving the MS eject member 54 and the rear end portion of the memory stick 11 is protruded by a predetermined degree from the recording medium insertion port 40. By picking up and pulling out the protruding portion, the memory stick 11 can be taken out.

At this time, one surface of the opening/closing door 62 is slidably contacted with the inner surface of the memory stick 11. The guide protrusion 62a having a circular arc cross section which is provided on the one surface of the door 62 contacts with the inner surface of the memory stick 11. Thanks to this, at the time of taking out the memory stick 11, it is possible to prevent the occurrence of defects such as the engagement of the edge of the opening/closing door 62 with the inner surface of the memory stick 11 and the like and to ensure carrying out the operation for taking out the memory stick 11. Furthermore, since the stopper portion 73 of the spring member 71 of the erroneous insertion preventive mechanism 50 slides on the side surface of the memory stick 11, the spring member 71 does not hamper the operation for taking out the memory stick 11.

FIG. 15 shows the second embodiment of the opening/closing door for opening and closing the recording medium insertion port 40. This opening/closing door 85 has a guide protrusion 85a formed into a triangular angle shape. The guide protrusion 85a is formed by bulging the central portion of the opening/closing door 85 toward one surface side thereof and an R-shaped portion of an appropriate size is provided on the top. The other constituent elements of the opening/closing door 85 are the same as those of the opening/closing door 62 of the embodiment stated above. With such a configuration, it is possible to obtain the same effect as that of the above-stated embodiment.

While the present invention has been described so far, the present invention should not be limited to the above-stated embodiments. The above-stated embodiments have been described with respect to a case where the IC recording medium referred to as a memory stick is used as an information recording medium and applied to the erroneous insertion preventive mechanism 70 for preventing the erroneous insertion of the memory stick 11. For example, it is also possible to employ an information recording medium, such as a floppy disk (FD), having directionality by providing a notch portion which can be used in the same manner as that of the memory stick 11 and to apply the medium to an erroneous insertion preventive mechanism for preventing the erroneous insertion of the medium. As can be seen, the present invention can be modified in various manners within the scope of the sprit of the invention.

As stated so far, according to the electronic apparatus recited in claim 1 of the present invention, the erroneous insertion preventive mechanism is provided inside the recording medium insertion port. Due to this, when the information recording medium is inserted in a correct state, the notch portion for preventing the erroneous insertion of the information recording medium allows the passage of the medium and the medium is inserted to reach a predetermined position. When the information recording medium is inserted in a wrong state, the corners other than the notch portion hamper the passage of the information recording medium and the erroneous insertion of the medium can be thereby prevented. Besides, when a user inserts the information recording medium into the recording medium insertion port with the medium turned inside out and in the wrong insertion direction, it is possible to make the user recognize that the insertion operation is wrong in a relatively early stage because of the provision of the erroneous insertion preventive mechanism at a position close to the recording medium insertion port. Furthermore, compared with a case where the medium is inserted in a correct state, the insertion degree of the information recording medium is large when the medium is inserted in a wrong state. Due to this, it is possible to advantageously ensure making the user recognize that the recording medium insertion operation is wrong.

According to the electronic apparatus recited in claim 2 of the present invention, the spring member having the stopper portion and the support member constitute the erroneous insertion preventive mechanism. Owing to this, by protruding the stopper portion of the spring member supported by the support member forward in the insertion direction of the information recording medium, the stopper portion is guided by the notch portion and moved outside only when the information recording medium is inserted in a correct state to thereby allow the insertion operation of the information recording medium, and the stopper portion is abutted against the corners other than the notch portion when the information recording medium is inserted in a wrong state to thereby hamper the insertion operation of the information recording medium. Accordingly, when a user is to insert the information recording medium into the recording medium insertion port with the medium turned inside out and in the wrong insertion direction, it is advantageously possible to recognize the erroneous insertion of the medium at a position close to the recording medium insertion port and to ensure making the user recognize the erroneous insertion in a relatively early stage.

According to the electronic apparatus recited in claim 3 of the present invention, the support member is constituted by the fixed portion and the support portion and the support portion is provided with a guide groove. Due to this, when the information recording medium is inserted in a correct state, the notch portion can move the stopper portion outside along the guide groove to allow the insertion operation of the information recording medium. When the information recording medium is inserted in a wrong state, the stopper portion is engaged inside the guide groove by the corners other than the notch portion to thereby advantageously make it possible to prevent the insertion operation of the information recording medium and to ensure preventing the erroneous insertion of the information recording medium.

According to the electronic apparatus recited in claim 4 of the present invention, a guide groove is provided at the paired support pieces as the support portion and the guide groove supports the both ends of the stopper portion. Due to this, when the information recording medium is inserted in a wrong state and corners other than the notch portion are abutted against the stopper portion, the both ends of the stopper portion are supported by the paired support pieces. It is, therefore, advantageously possible to resist the excessive insertion force applied from the user and to prevent the damages of the information recording medium and/or the apparatus main body because of forcedly applying the insertion force.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An electronic apparatus for recording and/or reproducing an information signal using an information recording medium having a notch portion at one end thereof, said electronic apparatus comprising:

a recording medium insertion port for inserting and removing the information recording medium into/out of the electronic apparatus; and an erroneous insertion preventive mechanism provided inside said recording medium insertion port to prevent erroneous insertion of said information recording medium, wherein said erroneous insertion preventive mechanism includes a continuous wire member which includes a pair of spring portions and a stopper portion formed continuously with a tip end section of one of said pair of spring portions with said stopper portion in a rest position thereof protruding forwarding in the insertion direction of the information recording medium whereby said stopper portion is displaceable between a first position, wherein said stopper portion is moved outwardly of the insertion direction of the information recording medium when the notch portion of the information recording medium contacts the stopper portion to thereby allow the insertion of the information recording medium into the electronic apparatus, and a second position, wherein when said stopper position contacts a corner of said information recording medium other than said corner with said notch portion, said stopper portion remains in its rest position thereby preventing the insertion of the information recording medium.

2. An electronic apparatus according to claim 1, characterized in that said support portion has a pair of support pieces formed to stride said inserted information recording medium and provided to overlap with said guide groove, the pair of support pieces supporting both ends of said stopper portion.

3. An electronic apparatus according to claim 1, wherein the information recording medium is provided with a concave portion opened in a forward direction and a lateral direction of the notch portion and the electronic apparatus is equipped with a convex portion capable of engaging with the concave portion at one corner portion of an innermost inside portion of the recording medium insertion port, and after the erroneous insertion preventive mechanism allows the insertion of the information recording medium the concave portion engages with the convex portion.

4. An electronic apparatus according to claim 1, wherein an opening/closing mechanism is equipped inside of the recording medium insertion port, the opening/closing mechanism comprising a rectangular plate-state opening/closing door with a cylindrical portion at one end thereof, a support shaft to be inserted in the cylindrical portion, a spring member which is fitted on the support shaft and urges the opening/closing door in the direction so as to close the recording medium insertion port and a door receiving surface so that another end of the opening/closing door is press-contacted thereto.

5. An electronic apparatus according to claim 4, wherein the door receiving surface is set at a position deeper than a distance between a front surface of the recording medium insertion port and the support shaft.

6. An electronic apparatus according to claim 4, wherein a guide protrusion is provided on one surface of the opening/closing door.

7. An electronic apparatus according to claim 1 wherein said erroneous insertion preventive mechanism further includes a support member for allowing the stopper portion to be elastically deformed and supporting said pair of spring portions; and wherein said support member has a fixed portion for supporting one end of said continuous wire member and a support portion formed integrally with the fixed portion, the support member being provided with a guide groove for moving said stopper portion relative to said notch portion to generate a reaction force relative to the corners of the information recording medium which do not include said notch portion.

* * * * *